US 6,547,361 B1

(12) United States Patent
Suzuki et al.

(10) Patent No.: US 6,547,361 B1
(45) Date of Patent: Apr. 15, 2003

(54) IMAGE RECORDING APPARATUS WHICH COMPENSATES FOR A DEFECTIVE RECORDING AREA

(75) Inventors: Akio Suzuki, Yokohama (JP); Kiyoharu Tanaka, Tokyo (JP); Yoshihiro Takada, Kawasaki (JP); Yasushi Miura, Kawasaki (JP); Nobuhiko Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/489,910

(22) Filed: Jan. 24, 2000

Related U.S. Application Data

(62) Division of application No. 08/021,102, filed on Feb. 23, 1993, now Pat. No. 6,036,300.

(30) Foreign Application Priority Data

| Feb. 26, 1992 | (JP) | 4-039165 |
| Feb. 26, 1992 | (JP) | 4-039169 |
| Feb. 18, 1993 | (JP) | 5-028915 |
| Feb. 18, 1993 | (JP) | 5-028916 |

(51) Int. Cl.[7] .............................................. B41J 2/205
(52) U.S. Cl. ....................................................... 347/19
(58) Field of Search ........................ 347/19, 23; 400/74

(56) References Cited

U.S. PATENT DOCUMENTS

| 4,138,693 A | 2/1979 | Iizuka |
| 4,313,124 A | 1/1982 | Hara |
| 4,345,262 A | 8/1982 | Shirato et al. |
| 4,401,991 A | 8/1983 | Martin |
| 4,435,674 A | * 3/1984 | Hevenor et al. ............... 347/19 |
| 4,459,600 A | 7/1984 | Sato et al. |
| 4,463,359 A | 7/1984 | Ayata et al. |
| 4,558,332 A | * 12/1985 | Takahashi .................... 347/14 |
| 4,558,333 A | 12/1985 | Sugitani et al. |
| 4,723,129 A | 2/1988 | Endo et al. |

(List continued on next page.)

FOREIGN PATENT DOCUMENTS

| EP | 0 046 118 | 2/1982 |
| EP | 0 332 787 | 9/1989 |
| EP | 0 347 805 | 12/1989 |
| EP | 0 443 832 | 8/1991 |
| EP | 0 465 420 | 1/1992 |
| EP | 0 568 283 | 11/1993 |
| JP | 54-056847 | 5/1979 |

(List continued on next page.)

*Primary Examiner*—John Barlow
*Assistant Examiner*—Julian D. Huffman
(74) *Attorney, Agent, or Firm*—Fitzpatrick, Cella, Harper & Scinto

(57) ABSTRACT

An image recording apparatus records an image on a recording medium by causing a recording head having an arrangement of a plurality of recording elements to conduct its main scanning for the recording medium interrelatedly in the direction opposite to the arrangement of the recording elements. The apparatus comprises a setting device to set the number of main scannings by the recording head; a main scanning device to perform recording by plural numbers of main scannings with respect to one pixel by causing the recording head to conduct its main scannings for the same recording area of the recording medium in accordance with the number set by the setting device; and a sub-scanning device to cause the recording head and the recording medium to be sub-scanned interrelatedly per main scanning in an amount smaller than the width of the arrangement of the recording elements of the recording head. Hence, even if a disabled ejection occurs in one scanning at the time of recording by a multi-scanning, the missing dot is complemented by the following scan to make it possible to obtain an image having no image defects at all times.

2 Claims, 27 Drawing Sheets

U.S. PATENT DOCUMENTS

| | | |
|---|---|---|
| 4,740,796 A | 4/1988 | Endo et al. |
| 4,772,911 A | 9/1988 | Sasaki et al. |
| 4,785,750 A * | 11/1988 | Best .......................... 356/437 |
| 4,860,034 A * | 8/1989 | Watanabe et al. ............. 347/14 |
| 4,864,328 A | 9/1989 | Fischbeck |
| 4,907,013 A * | 3/1990 | Hubbard et al. .............. 347/19 |
| 4,908,635 A | 3/1990 | Iwasawa et al. |
| 4,969,951 A * | 11/1990 | Koike et al. ................ 347/100 |
| 4,978,969 A | 12/1990 | Chieng |
| 5,006,862 A | 4/1991 | Adamic |
| 5,079,563 A | 1/1992 | Starkweather et al. |
| 5,111,302 A | 5/1992 | Chan et al. |
| 5,124,720 A * | 6/1992 | Schantz ....................... 347/19 |
| 5,146,236 A | 9/1992 | Hirata et al. |
| 5,155,503 A | 10/1992 | Tasaki et al. |
| 5,189,521 A | 2/1993 | Ohtsubo et al. |
| 5,321,467 A | 6/1994 | Tanaka et al. |
| 5,432,533 A | 7/1995 | Shibamiya |
| 5,541,626 A | 7/1996 | Hiramatsu et al. |
| 5,587,728 A | 12/1996 | Edgar |
| 5,596,353 A | 1/1997 | Takada et al. |
| 5,798,773 A | 8/1998 | Hiramatsu et al. |
| 6,033,054 A * | 3/2000 | Takagi ........................ 347/43 |
| 6,089,695 A | 7/2000 | Takagi et al. ................ 347/40 |

FOREIGN PATENT DOCUMENTS

| | | | | |
|---|---|---|---|---|
| JP | 58-39468 | 3/1983 | | |
| JP | 59-123670 | 7/1984 | | |
| JP | 59-138461 | 8/1984 | | |
| JP | 59-209146 | 11/1984 | | |
| JP | 60-071260 | 4/1985 | | |
| JP | 60-201965 | 10/1985 | | |
| JP | 61-123545 | 6/1986 | | |
| JP | 361123545 A * | 6/1986 | .................. | 400/74 |
| JP | 61-194975 | 8/1986 | | |
| JP | 62-053492 | 3/1987 | | |
| JP | 62-295562 | 12/1987 | | |
| JP | 63-023981 | 2/1988 | | |
| JP | 63-067163 | 3/1988 | | |
| JP | 63-085188 | 4/1988 | | |
| JP | 02-192957 | 7/1990 | | |
| JP | 03-046589 | 7/1991 | | |
| WO | WO 93 04443 | 3/1993 | | |

* cited by examiner

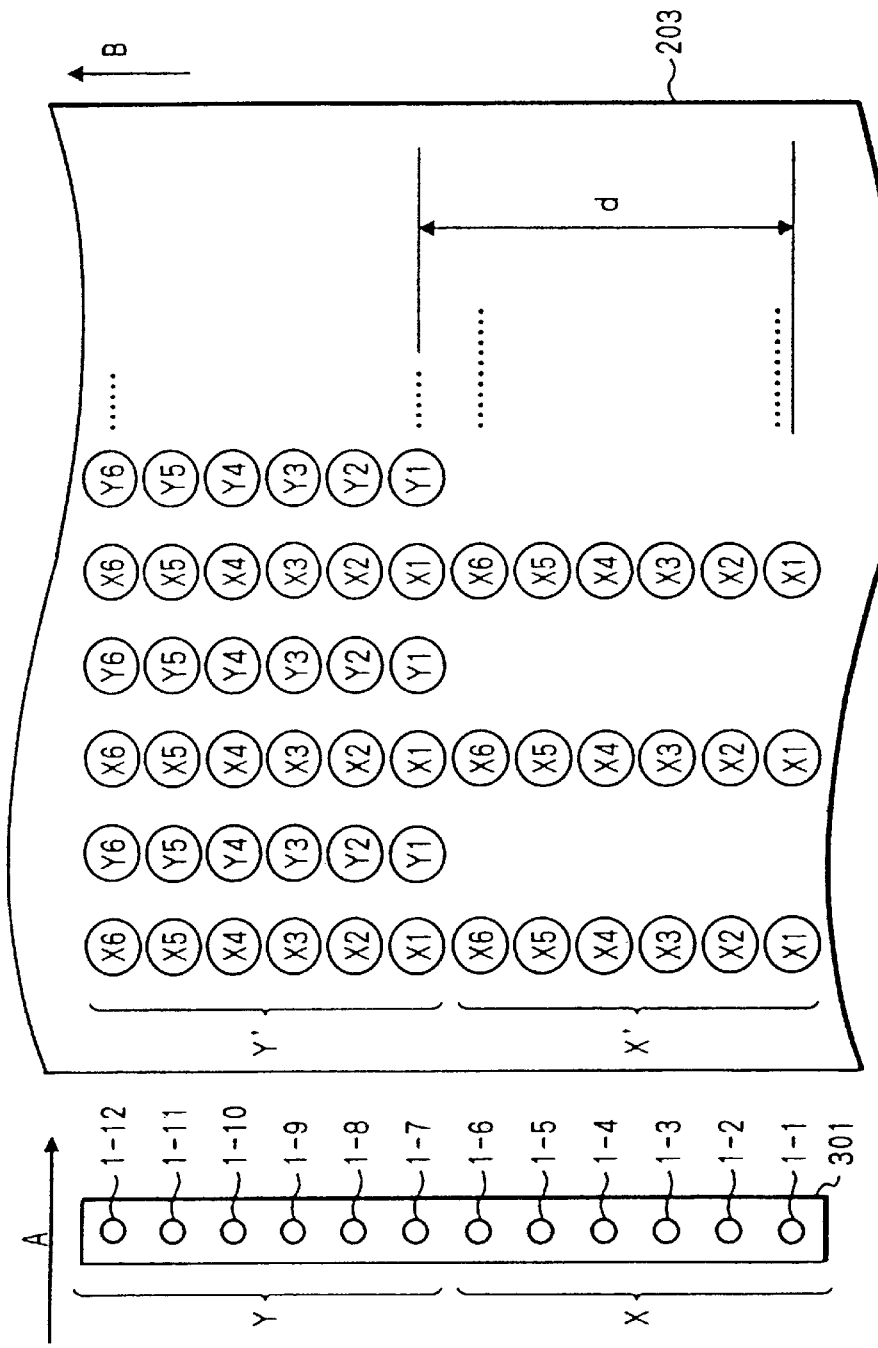

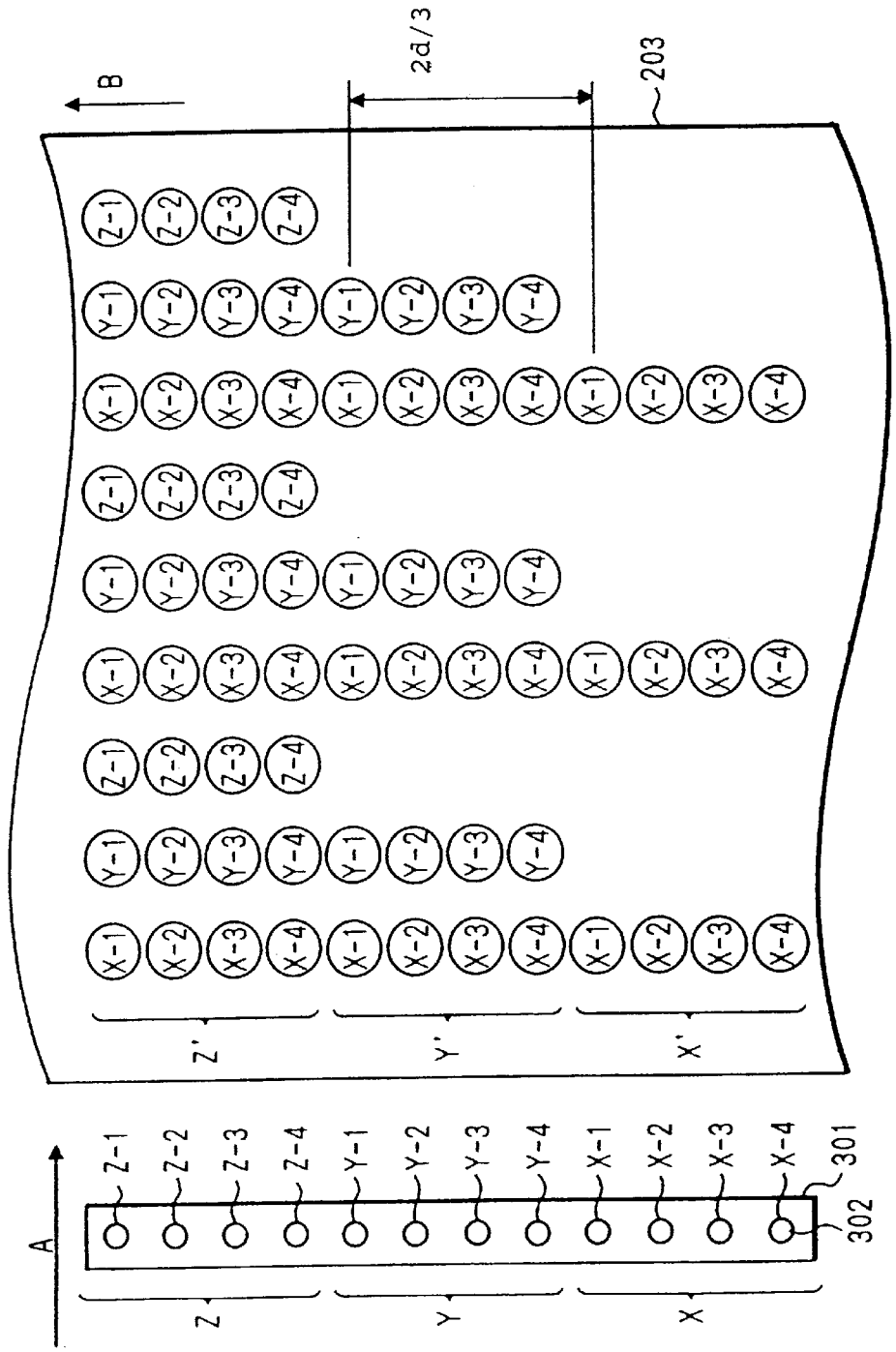

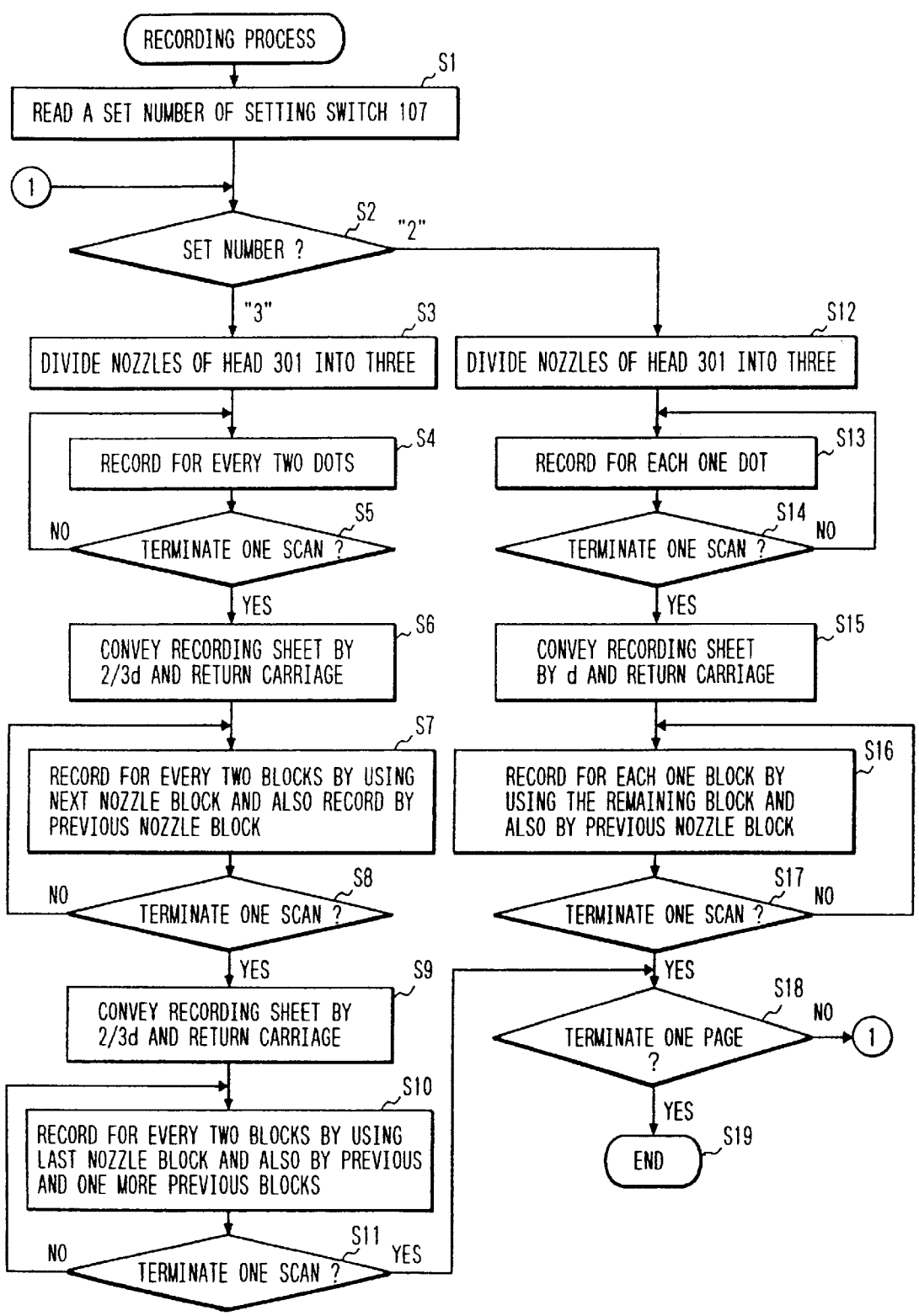

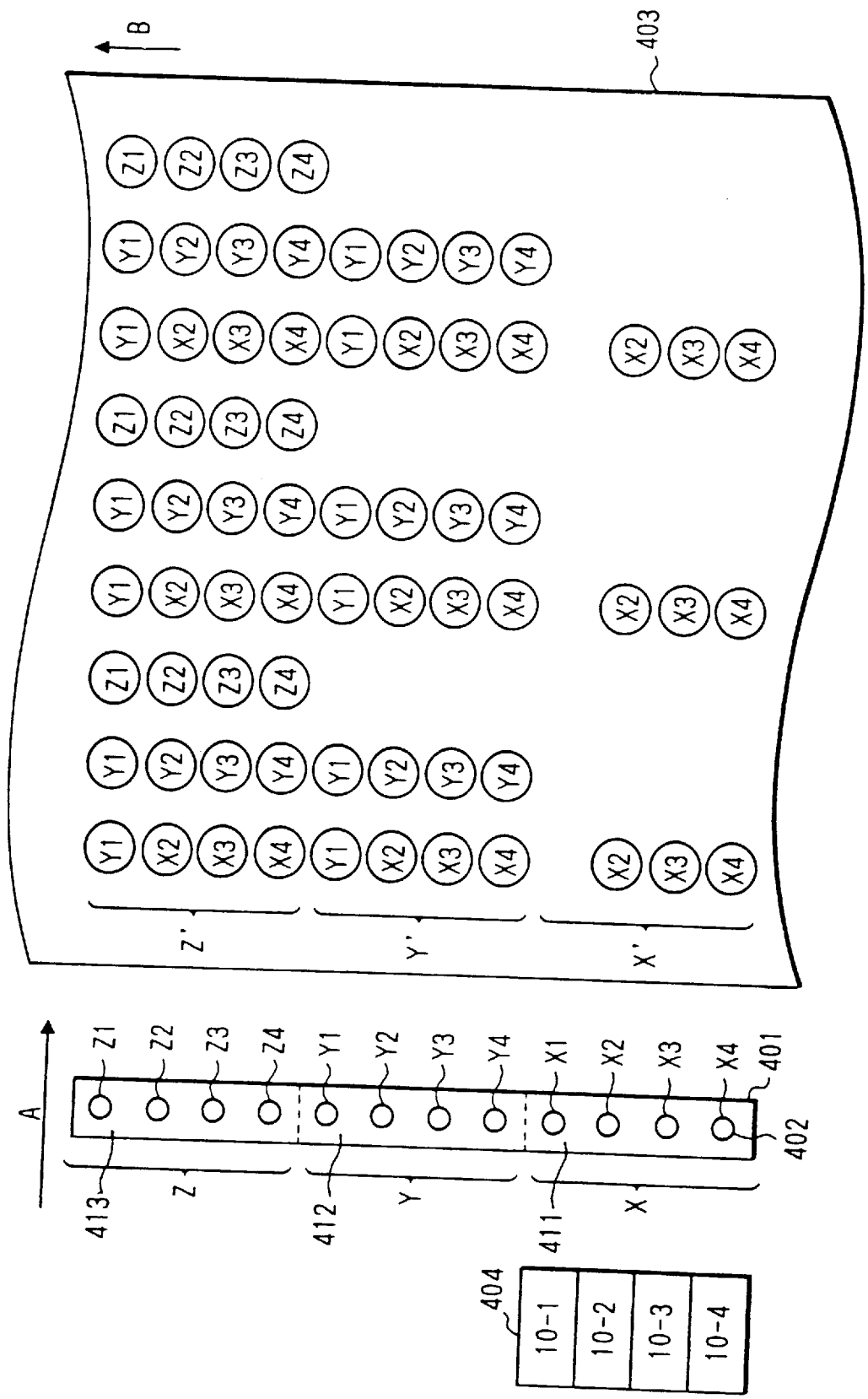

IMAGE RECORDING APPARATUS WHICH COMPENSATES FOR A DEFECTIVE RECORDING AREA

This is a divisional application of application Ser. No. 08/021,102 filed on Feb. 23, 1993 now U.S. Pat. No. 6,036,300.

BACKGROUND OF THE INVENTION

1. Field of the Invention

The present invention relates to a method for recording image and an apparatus therefor, and a medium recorded by such an apparatus. More particularly, the invention relates to an image recording method to record an image on a recording medium by enabling a recording head to scan, and an apparatus therefor, and a medium recorded by such an apparatus.

2. Related Background Art

There is well known an image recording apparatus of the so-called serial scanning type wherein a recording head provided with a plurality of recording elements (exothermic resistive members, nozzles, and the like) is caused to scan for recording. FIG. 2 is a view illustrating a recording method of such a serial scanning type as this, in which a reference numeral 201 designates an ink jet head with an arrangement of plural nozzles 202. An image recording is performed per recording width d corresponding to the arrangement of the nozzles 202 of this ink jet head 201 while the ink jet head 201 is being scanned on a recording sheet 203 in the direction A. Thus, when a recording of the recording width d is terminated, the recording sheet 203 is shifted in the direction B for a length corresponding to the recording width d. Then, the ink jet head 201 is again caused to scan in the direction A to perform another image recording for the recording width d. The recording by such a serial scanning method as this has an advantage that an image data having a large image surface can be recorded by a small head. On the other hand, there is a disadvantage that should there be any nozzles that may be disabled to eject ink or may cause the positions of recorded dots to be displaced among the nozzles of the head 201, such a portion appears continuously in the direction A, which tends to create continuous white streaks. In order to compensate for a disadvantage of the kind, there is proposed a recording method by multi-scanning which will be described later.

FIG. 3A is a view illustrating such a multi-scanning as this.

An ink jet head 301 has twelve nozzles as designated by reference numerals 1-1 to 1-12. These nozzles can be divided into two portions indicated by reference marks X and Y. Here, the nozzles corresponding to the X portion are represented by 1-1 to 1-6 while the nozzles corresponding to the Y portion are represented by 1-7 to 1-12. At first, a recording by the X portion of the ink jet head 301 is performed with the initial scanning for recording on the portion of a recording sheet 203 at X' (the recorded dots by this recording are represented by X1 to X6). Then, in continuation, the recording sheet 203 is shifted in the direction B in the sub-scanning direction by an amount d in order to record dots Y1 to Y6 (represented by Y') using the Y portion of the head 301. By recording in this way, the dots recorded by the use of the same nozzles are not continuous in the direction A. Therefore, even if there are nozzles causing the positions of the recording dots to be displaced, the dots thus recorded do not appear continuously in the direction A; hence resulting in an advantage that the white streaks in the direction A are not remarkably noticeable.

Also, the recording density unevenness due to the irregularity of ink ejection amounts per nozzle is offset by the recording thus performed, and such unevenness is not remarkably noticeable, either. Also, if the recording duty of the ink jet head is high, the ink mist is accumulated in the vicinity of the orifice to hinder the ink ejection in some cases, but when the multi-scanning is performed, dots are thinned out to enable the number of ink ejections per unit period of time to be reduced; hence suppressing the generation of the mist. An advantage is brought about that the disabled ejection due to mist is reduced.

Nevertheless, there are still the images for which the ink ejection defects causing the white streaks, density unevenness, and mist cannot be prevented only by the foregoing two-time multi-scanning. For example, if a uniform pattern should be recorded, the white streaks and density unevenness become extremely conspicuous, and in some cases, not only the foregoing two-time multi-scanning, three- or four-time multi-scanning is also required.

Also, for an image requiring a high recording duty, it is insufficient to make the recording duty a half by the two-time multi-scanning. There are some cases where it is better to reduce the recording duty to a ⅓ or ¼ by the three- or four-time multi-scanning.

On the other hand, however, there is a problem that if the number of multi-scannings is increased, the recording period of time is prolonged that much.

FIG. 3B is a view illustrating another example of such a multi-scanning as this.

The nozzles 302 of the ink jet head 301 can be divided into three portions designated by reference marks X, Y, and Z. The portions include the nozzles X-1 to X-4, Y-1 to Y-4, and Z-1 to Z-4, respectively. At first, with the initial scanning, a recording is performed by the portion X of the ink jet head 301 for the portion of the recording sheet 203 at X' (the dots formed by this recording are represented by X-1 to X-4).

Then, the recording sheet 203 is shifted in the direction B by d in the sub-scanning direction, and dots Y-1 to Y-4 (represented by Y') are recorded using the portion Y of the head 301. However, at this juncture, the portion X of the ink jet head 301 performs its recording in a position at X. Then, continuously, the recording sheet 203 is again shifted in the direction B by d for recording by the use of the portion Z of the ink jet head 301. At this juncture, as shown in FIG. 3B, the recording is performed in such a manner that the dots recorded by the use of the same nozzle are not continuous in the direction A. Therefore, even if there are the nozzles causing the displacement of the recording dots, the dots thus recorded do not appear continuously in the direction A. The advantage is that the white streaks in the direction A are not remarkably noticeable.

However, if there are any nozzles performing incomplete ejection, a problem is still encountered that the white streaks remain as clear image defects, although the white streaks are less conspicuous by the multi-scanning than by the usual serial scanning. Particularly when the recording duty is high, the ink mist is apt to be generated. This type of ink mist is accumulated on the head surface to cover the nozzles; thus disabling the ink ejection in some cases. A disabled ink ejection of the kind is different from the genuine nozzle clogging or the like, and is dependent on the degree of the density of an image. As a result, it occurs at random in an image or it is often recovered itself; thus making its countermeasure difficult.

Also, in FIG. 3B, when the head is scanned in the direction A to record an image, the head temperature is increased due to the accumulation of the ejection driving energy. Thus, the viscosity of ink is lowered and the ejecting amount of ink is also increased. As a result, the image density is in general higher toward the termination of recording than at the time of initiating the recording at each scan. This phenomenon generally presents a problem in a any image, but particularly when output images are joined together to form one image, that is, when the so-called enlarged continuous copying mode is used, the difference in densities will become more conspicuous. If a multi-scanning is performed, the number of ink droplets ejected per unit time per nozzle is reduced as is clear from FIG. 3B. In the case represented in FIG. 3B, it is reduced to a ⅓ approximately. Therefore, the head temperature rise is suppressed as compared to the case of using the usual serial scanning. However, the above-mentioned problem still remains unsolved. Also, the seriousness of this problem differs depending on the image pattern to be recorded. In other words, when a pattern having a large image ratio is recorded, this becomes a serious problem, but when a pattern having a small image ratio is recorded, it is not so serious a problem.

SUMMARY OF THE INVENTION

The present invention is designed in consideration of the problems related to the prior art as described above with attention given to a new aspect which has never been predicted.

It is a first object of the present invention to provide a method for recording image capable of obtaining a recorded image of a high image quality without lowering its recording speed unnecessarily by setting the number of multi-scannings in accordance with the image data to be recorded, and an apparatus therefor, and a medium recorded by such an apparatus.

Also, it is another object of the first invention to provide an image recording apparatus, in which a recording head having the arrangement of plural recording elements is caused to perform its main scanning relatively with respect to a recording medium in the direction different from the foregoing arrangement to record the image on the recording medium, comprising the following:

setting means to set up a number of the main scannings by the aforesaid recording head;

main scanning means to cause the aforesaid recording head to perform its main scannings for a same recording area in accordance with the main scanning number set up by the aforesaid setting means in order to perform recording by the number of plural main scannings per pixel; and sub-scanning means to cause the aforesaid recording head and the aforesaid recording medium to be relatively sub-scanned per the aforesaid main scanning for an amount smaller than the width of the area where the recording elements of the recording head are arranged.

Also, it is a second object of the present invention to provide a method for recording image capable of obtaining a recorded image having a high image quality without any image defects, and an apparatus therefor, and a medium recorded by such an apparatus.

Further, it is another object of the second invention to provide an image recording apparatus to record image on a recording medium by causing a recording head having a plurality of recording elements to relatively scan the recording medium, comprising the following:

recording means to perform recording by causing the aforesaid recording head to relatively scan the recording area of the aforesaid recording medium for plural numbers;

reading means to read a recorded image which is recorded on the aforesaid recording medium by relatively scanning the recording area of the aforesaid recording medium together with the aforesaid recording head at the time of the execution of recording by the aforesaid recording means;

determining means to determine an area having a defective recording by comparing the recorded image read by the aforesaid reading means with the information of the image to be recorded essentially; and complementary recording means to perform a complementary recording in the subsequent scanning by the aforesaid recording head for the area having the defective recording determined by the aforesaid determining means.

Also, it is other objects of the present invention to provide a method for recording image on a recording medium using these image recording apparatuses, and a medium recorded as a result thereof.

It should be noted that the term "recording" used in the present specification and claims includes a meaning of "printing" and signifies in a broad sense providing an image on a recording medium such as cloths made of cotton or silk, etc. and paper. It should be also noted that the language "recording" does not limit the scope of the invention.

BRIEF DESCRIPTION OF THE DRAWINGS

FIGS. 3A and 3B are views illustrating multi-scanning recording methods.

FIG. 4 is a flowchart showing the control process in a printing apparatus according to the first embodiment of the first invention.

FIG. 13 is a view illustrating the recording operation of a fourth embodiment of the second invention.

DETAILED DESCRIPTION OF THE PREFERRED EMBODIMENTS

Hereinafter, with reference to the accompanying drawings, the detailed description will be made of the preferable embodiments according to the present invention.

Figure 8:
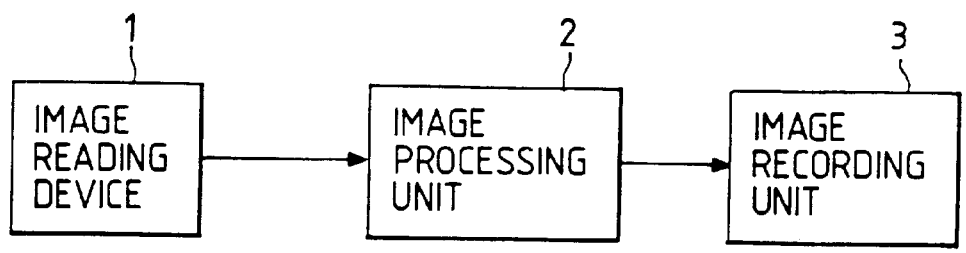
FIG. 8 is a block diagram showing a structural example of the system of a recording apparatus according to the present invention.

FIG. 8 is a block diagram showing an example of the fundamental structure which is applied to an ink jet recording apparatus exemplified as an image recording apparatus according to the present invention. This ink jet recording apparatus is structured as a system roughly comprising:

an image reading device 1 to read an original image produced by a designer and others and convert this original image into the original image data which represent the original image by electric signals;

an image processing unit 2 to receive the original image data from the image reading device 1 for processing and output them as the image data; and an image recording unit 3 to perform recording on cotton, silk, and other recording media in accordance with the image data produced by the image processing unit 2. In the image reading device 1, the original image is read by a CCD image sensor. In the image processing unit 2, the data are produced from the inputted original image data in order to drive the ink jet recording unit A-2 (FIG. 9) which ejects four color ink materials, magenta (abbreviated as M), cyanogen (abbreviated as C), yellow (abbreviated as Y), and black (abbreviated as Bk), which will be described later. When the data are produced, there are performed an image processing for the reproduction of the original image with ink dots; the distribution of colors to determine the color tone; the modification of the layout; and the rearrangement of the sizes for and the selection of the patterns by enlargement, contraction, or the like. In the image recording unit 3, recording is performed by the ink jet recording unit A-2. The ink jet recording unit A-2 causes fine ink droplets to fly toward the recording medium for recording by the adhesion of these ink droplets to the recording medium.

Figure 10:
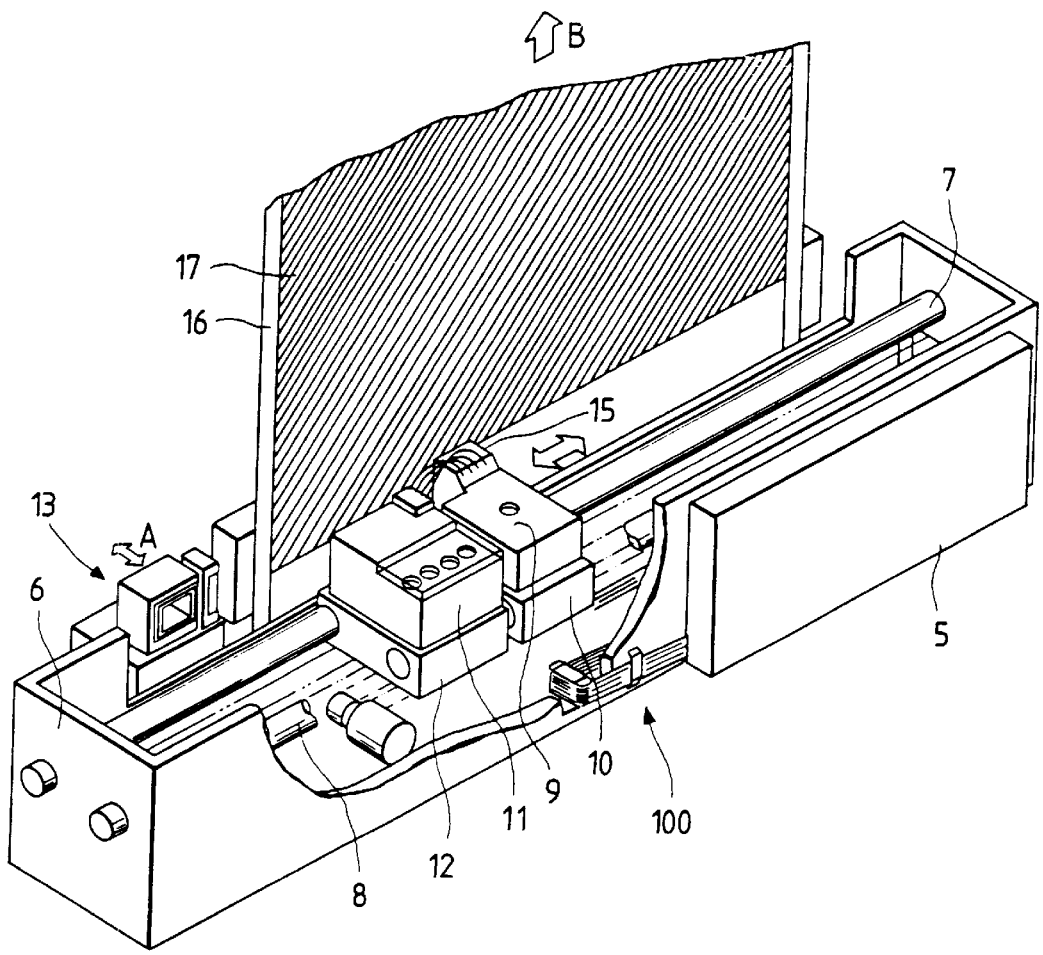
FIG. 10 is a partially cut off perspective view showing a structural example of the principal part of an ink jet recording apparatus according to the present invention.

FIG. 10 is a perspective view showing an example of an ink jet recording apparatus to be used for the present invention.

At first, an ink jet recording unit 100 is structured by a frame 6, two guide rails 7 and 8, an ink jet head 9 and a carriage 10 to carry the head, an ink supply device 11 and a carriage 12 to carry it, and a head recovery device 13 and an electric power supply system 5 according to the broad classification of the constituents. The ink jet head 9 (hereinafter simply referred to as head) includes a plurality of nozzle arrays and transducers to transduce electric signals into the ink ejection energy, and has a mechanism to selectively eject ink from the nozzle arrays in accordance with the image signals transmitted from an image processing unit (not shown).

The foregoing head is a recording head which ejects ink by the utilization of thermal energy, and is provided with the thermal energy transducers which generate thermal energy given to ink. It is preferable to use a head wherein the ink is caused to change its state by the thermal energy given thereto by the foregoing thermal energy transducers to eject it from the discharging ports on the basis of the foregoing change of state thus generated.

The ink supply device 11 stores ink and supplies it to the head as required, and has an ink tank, an ink pump, and the like which are not shown. The supply device 11 and the head 9 are connected by ink supply tubes 15, and usually, the ink is automatically supplied to the head 9 by a capillary phenomenon by the amount to be ejected. Also, in operating a head recovery which will be described later, the ink is forcibly supplied to the head 9 using the ink pump.

The above-mentioned head 9 and ink supply device 11 are respectively mounted on a carriage 10 and a carriage 12, and are structured to reciprocate along the guide rails 7 and 8 by a driving device which is not shown.

The head recovery device 13 is provided at a position opposite to the head 9 in the home position (standby position) of the head 9 in order to maintain the ink ejection stability of the head, and is able to advance or retract in the direction indicated by an arrow A. More specifically, it will operate as given below.

At first, the capping of the head 9 (capping operation) is performed in the home position in order to prevent ink in the nozzles of the head 9 from being evaporated when the head is at rest, or to execute a function to collect the exhausted ink when an operation (pressurized recovery operation) is performed to cause ink to be exhausted forcibly from the nozzles by giving pressure to the ink passage in the head by the use of a pump in order to remove bubbles and dust particles in the nozzles before starting an image recording, or an operation (suction recovery operation) is performed to suck and exhaust ink forcibly from the nozzles.

The electric power supply system 5 includes a control unit to control the overall sequence of the power unit and ink jet recording unit. A cloth 16 is fed for a given amount in the sub-scanning direction (direction indicated by an arrow B) by a feeding device which is not shown for each time a recording is performed for a given length with the shifting of the head 9 along the carriage 7 in the main scanning direction. Thus, the image formation is carried out. In FIG. 10, the portion 17 indicated by slanted lines represents the portion where the recording has been made.

In this respect, it may be possible for the recording head 9 to use an ink jet recording head for a monochrome recording, the plural recording heads to perform recording in ink of different colors for a color recording, or plural recording heads to perform recording in a variable density ink of a same color among others.

Also, irrespective of the recording means and the structures of the ink tank, it is possible to apply various types of heads such as a cartridge type wherein a recording head and an ink tank are formed integrally, or a type which is structured by connecting the separately formed recording head and ink tank by the ink supply tubes.

Figure 9:
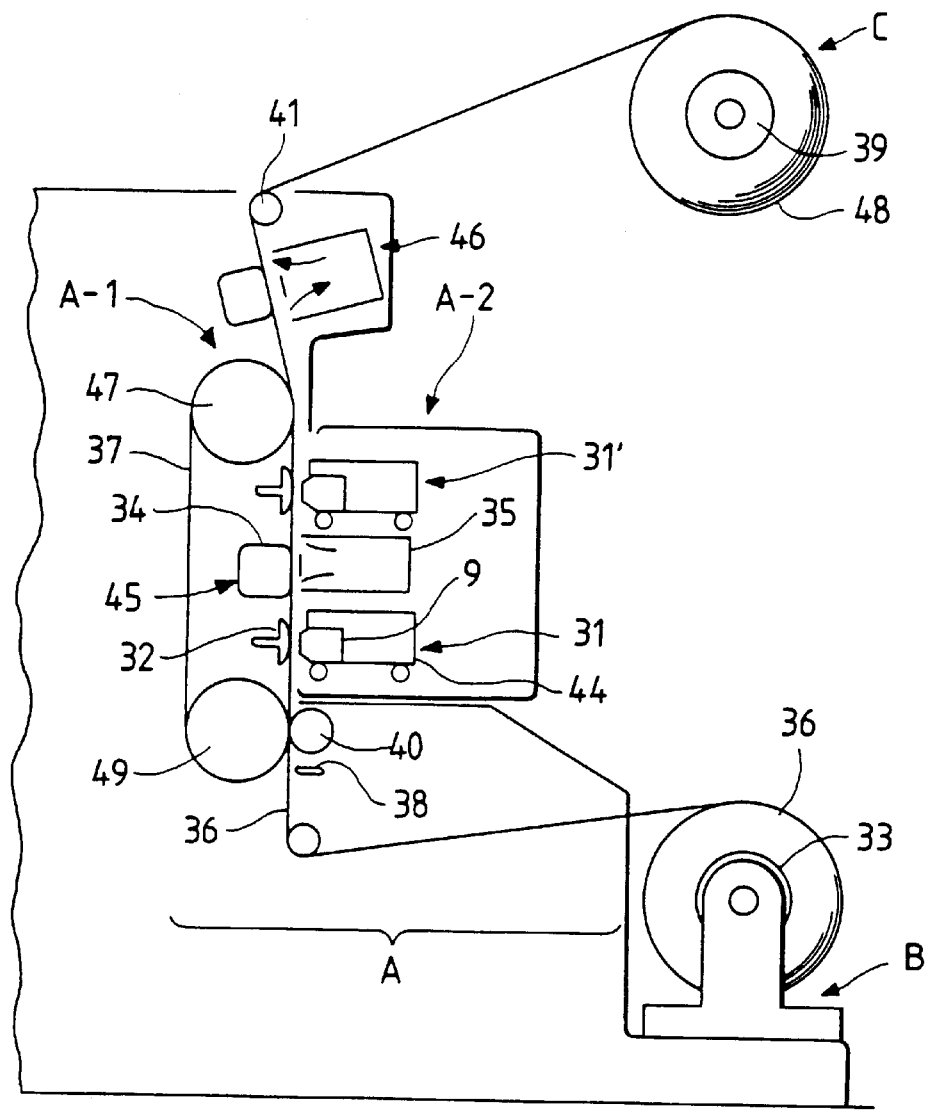
FIG. 9 is a view schematically showing a mode of a recording apparatus provided with a two-staged head preferably suitable for the present invention.
Figure 11:
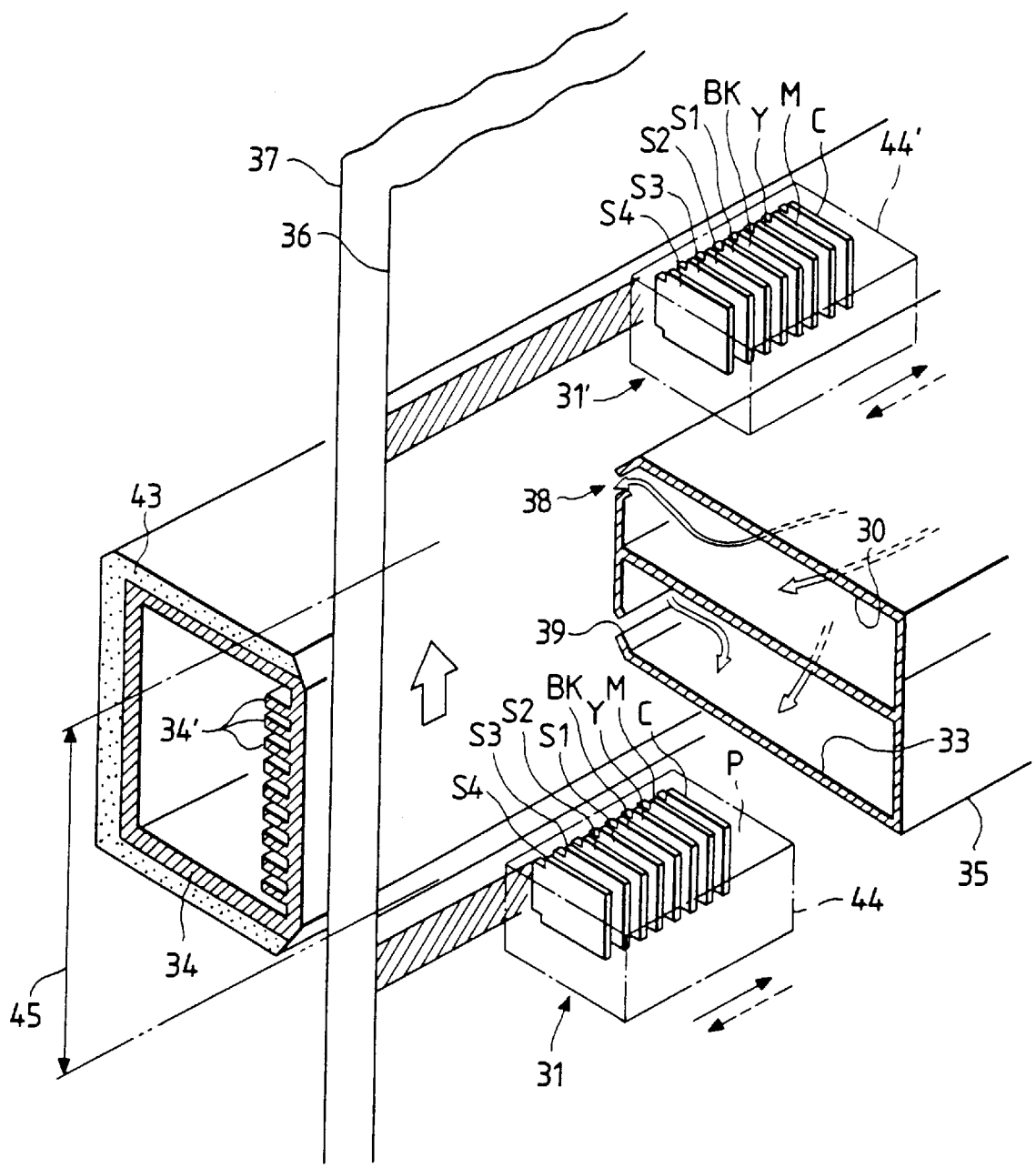
FIG. 11 is an enlarged perspective view showing the structure of the vicinity of the head unit of the recording apparatus shown in FIG. 9.

Furthermore, it is possible to obtain images of a high quality on a recording medium having an extremely low water absorption by implementing the present invention in a recording apparatus of a mode set forth below. FIG. 9 is a view schematically showing a recording apparatus particularly preferable for a method of the present invention. This recording apparatus roughly comprises a cloth supply unit B to feed a rolled cotton cloth, silk, or other recording media which are preliminarily processed for printing; a main unit A to precisely feed the cloth thus carried line by line for printing by the ink jet head; and a winding unit C to dry and wind the printed cloth. The main unit A further comprises a precision feed unit A-1 for cloth including a platen, and a printing unit A-2. FIG. 11 is a perspective view showing the structure of the printing unit A-2 in detail.

Hereinafter, taking as an example a case of printing a preliminarily processed cloth as a recording medium, the operation of this apparatus will be described.

A rolled cloth 36 which is preliminarily processed is fed to the cloth supply unit and then to the main unit A. In the main unit, a thin endless belt 37 is tensioned around a driving roller 47 and a winding roller 49, which is step driven precisely. The driving roller 47 is step driven directly by a high resolution stepping motor (not shown) to step feed the belt by such a stepping amount thereof. The cloth 36 thus fed is pressed and tensioned by a pressing roller 40 to the surface of the belt 37 which is backed up by the winding roller 49.

The cloth 36 thus step fed by the belt is positioned by the platen 32 arranged behind the belt in the first printing unit 31; thus being printed by the ink jet head 9 from its surface side. Each time one line of printing is terminated, the cloth is step fed for a predetermined amount. Then, it is dried from its surface by the heated draft produced by a hot plate 34 from the behind the belt and supplied or exhausted through a hot air duct 35. Subsequently, superposed printing is performed in the second printing unit 31' in the same method as in the first printing unit. The cloth printed completely is drawn apart and guided to a post drying unit 46 comprising the hot plate and hot air duct as in the foregoing drying unit where it is again dried; thus being guided by a guide roller 41 to the winding roller 48 for winding. The wound cloth is removed from the apparatus and processed as a finished product through a batch processing of coloring, cleaning, drying, and the like.

In accordance with FIG. 11, the details of the printing unit A-2 will be described.

A preferable mode here is such that by the head in the first recording unit, the information is recorded while thinning the dot numbers, and then, after the drying process, the ink droplets are ejected by the head in the second printing unit to complement the information which has been thinned in the first printing unit.

In FIG. 11, the cloth 36 which is a recording medium is mounted on the belt 37 under tension and is being step fed in the upper direction in FIG. 11. For the first printing unit 31 located in the lower part of FIG. 11, a first carriage 44 is provided with a mounted ink jet head for Y, M, C, Bk, and special colors S1 to S4. The ink jet head (recording head) used for this embodiment is a head having the elements which generate the thermal energy to give the film boiling utilized as energy to ink to cause it to be ejected, and in such a head, 128 discharging ports are arranged with a density of 400 DPI (dot/inch).

On the downstream side of the first printing unit, there are arranged a hot plate 34 to apply heat from the back side of the belt, and a drying unit 45 comprising a hot air duct 35 to effect drying from the surface side. The thermal conductive surface of the hot plate 34 is pressed to the heavily tensioned endless belt 37 to heat the feeding belt 37 strongly from its behind by a high pressure steam running at a high temperature in the hollow inside thereof. The conveyer belt 37 heats the mounted cloth 36 by the thermal conductivity directly and effectively. On the inner side of the hot plate, fins 34' are arranged to collect heat to converge it to the back side of the belt efficiently. The side which is not in contact with the belt is covered with a heat shielding member 43 in order to prevent any loss due to heat radiation.

On the surface side, a drying hot air is blown from a supply duct 30 on the downstream side to supply lower moisture air to the cloth being dried for the enhancement of its effect. Then, the air containing a sufficient amount of moisture running in the direction opposite to the conveying direction of the cloth is drawn into a suction duct 33 by the suction which is far greater than the drafting to prevent any leakage of the evaporated water so as not to form dews on the surrounding mechanical devices. The supply source of the heated air is provided on the rear side in FIG. 10, and the suction is conducted from the front side. The difference in pressure between the drafting outlet 38 and the suction inlet 39 against the cloth is arranged to be even all over the area in the longitudinal direction. The air drafting and suction units are offset to the downstream side from the center of the hot plate arranged on the back sides thereof so that the air can be applied to the location which is sufficiently heated. Hence, in the first printing unit 31, a great quantity of water contained in ink received by the cloth including the thinning agent is dried intensively.

On the downstream side (upward), the second printing unit 31' is arranged. The second printing unit is formed with a second carriage 44' of the same structure as the first carriage.

Figure 12:
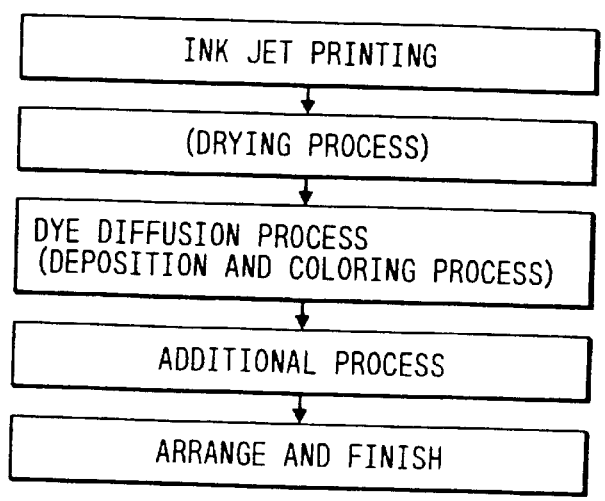
FIG. 12 is a block diagram illustrating an embodiment of an ink jet recording method.

Now, the description will be made of a preferable example of a recording method for the ink jet printing. FIG. 12 is a block diagram illustrating the printing method. As shown in FIG. 12, a cloth is dried (including natural drying) after the ink jet printing process. Then, continuously, the dyestuffs on the clothing fiber are dispersed, and a processing is effected to fix the dyestuffs to the fiber by reaction. By this processing, it is possible to obtain a sufficient coloring capability and durability by the fixation of the dyestuffs.

These processes of the diffusion and reactive fixation can be executed by a conventional method. A steaming method can be executed, for example. Here, in this case, it may be possible to provide an alkaline treatment to the cloth in advance before the printing process.

Then, in the post treatment process, the dyestuffs that have not shown any reaction and the substances that have been used in the preparatory process are removed. Lastly, the defect correction, iron finishing, and other finishing adjustment treatments are effected before the completion of the recording.

As recording media that can be used for the recording by an image recording apparatus according to the present invention, it is possible to use cotton, silk, wall papers, papers, OHP film, and others. Particularly, for a recording medium having a low water absorption, such as cotton, silk, and wall papers, the present invention is preferably suitable.

Here, in the present specification, the cotton and silk are meant to include every woven fabric, non-woven fabric, and other cloths irrespective of the raw materials, the methods for weaving and knitting.

Also, in the present specification, the wall papers include the adhesive materials for wallpapers which use papers, clothes, or polychloride vinyl and other synthetic resin sheets as its raw materials.

Particularly, for the ink jet printing, the cloths are to meet the following requirements:
(1) Colors should come out on ink in a sufficient density.
(2) Dye fixation factor is high for ink.
(3) Ink must be dried quickly on the cloth.
(4) The generation of irregular ink spread on the cloth is insignificant.
(5) The cloth should have an excellent capability of being fed in an apparatus.

In order to satisfy these capability requirements, it may be possible to give a preparatory treatment as required to the cloth to be used for printing. For example, in Japanese Patent Laid-Open Application No. 62-53492, the cloths having an ink receptacle layer are disclosed. Also, in Japanese Patent Publication No. 3-46589, there are proposed the cloths which contain reduction preventive agents or alkaline substances. As an example of such preparatory treatment as this, it is also possible to name a process to allow the cloth to contain a substance selected from an alkaline substance, water soluble polymer, water soluble metallic salt, or urea and thiourea.

As an alkaline substance, there can be named, for example, hydroxide alkali metals such as sodium hydroxide, potassium hydroxide; mono-, di-, and tori-ethanol amine, and other amine; and carbonate or hydrogen carbonate alkali metallic salt such as sodium carbonate, potassium carbonate, and sodium hydrogen carbonate. Furthermore, there are organic acid metallic salt such as calcium carbonate, barium carbonate or ammonia and ammonia compounds. Also, the sodium trichloroacetic acid and the like which become an alkaline substance by steaming and hot air treatment can be used. The alkaline substance which is particularly suitable for the purpose can be the sodium carbonate and sodium hydrogen carbonate which are used for dye coloring of the reactive dye stuffs.

As water soluble polymer, there can be named starchy substances such as corn and wheat; cellulose substances such as carboxyl methyl cellulose, methyl cellulose, hydroxy ethel cellulose; polysaccharide such as sodium alginic acid, gum arabic, locasweet bean gum, tragacanth gum, guar gum, and tamarind seed; protein substances such as gelatin and casein; and natural water soluble polymer such tannin and lignin.

Also, as synthetic polymer, there can be named, for example, polyvinyl alcoholic compounds, polyethylene oxide compounds, acrylic acid water soluble polymer, maleic anhydride water soluble polymer, and the like. Among them, polysaccharide polymer and cellulose polymer should be preferable.

As water soluble metallic salt, there can be named the pH4 to 10 compounds which produce typical ionic crystals, namely, halogenide compounds of alkaline metals or alkaline earth metals, for example. As a typical example of these compounds, $NaCl$, $Na_2SO_4$, $KCl$ and $CH_3COONa$ and the like can be named for the alkaline metals, for example. Also, $CaCl_2$, $MgCl_2$, and the like can be named for the alkaline earth metals. Salt such as Na, K and Ca should particularly be preferable.

In the preparatory process, a method is not necessarily confined in order to enable the above-mentioned substances and others to be contained in a cloth, but usually, a dipping method, padding method, coating method, spraying method, and others can be used.

Moreover, the printing ink given to the ink jet printing cloth merely adheres to it when printed on the cloth. Therefore, it is preferable to perform a subsequent reactive fixation process (dye fixation process) for the dye stuffs to be fixed on the cloth. A reactive fixation process such as this can be a method publicly known in the art. There can be named a steaming method, HT steaming method, thermofixing method, for example. Also, alkaline pad steaming method, alkaline blotch steaming method, alkaline shock method, alkaline cold fixing method, and the like can be named when a cloth is used without any alkaline process being given in advance.

Further, the removal of the dye stuffs which have not reacted and the substance used in the preparatory process can be performed by cleaning by the publicly known method in the art subsequent to the above-mentioned reactive fixation process. In this respect, it is preferable to conduct a conventional fixing treatment at the time of this cleaning.

The above-mentioned structure of the ink jet recording apparatus, and the preparatory and post processes for the cloth are preferably applicable to first and second inventive concepts set forth below.

Now, the description will be made of the first inventive concept in detail.

Figure 1:
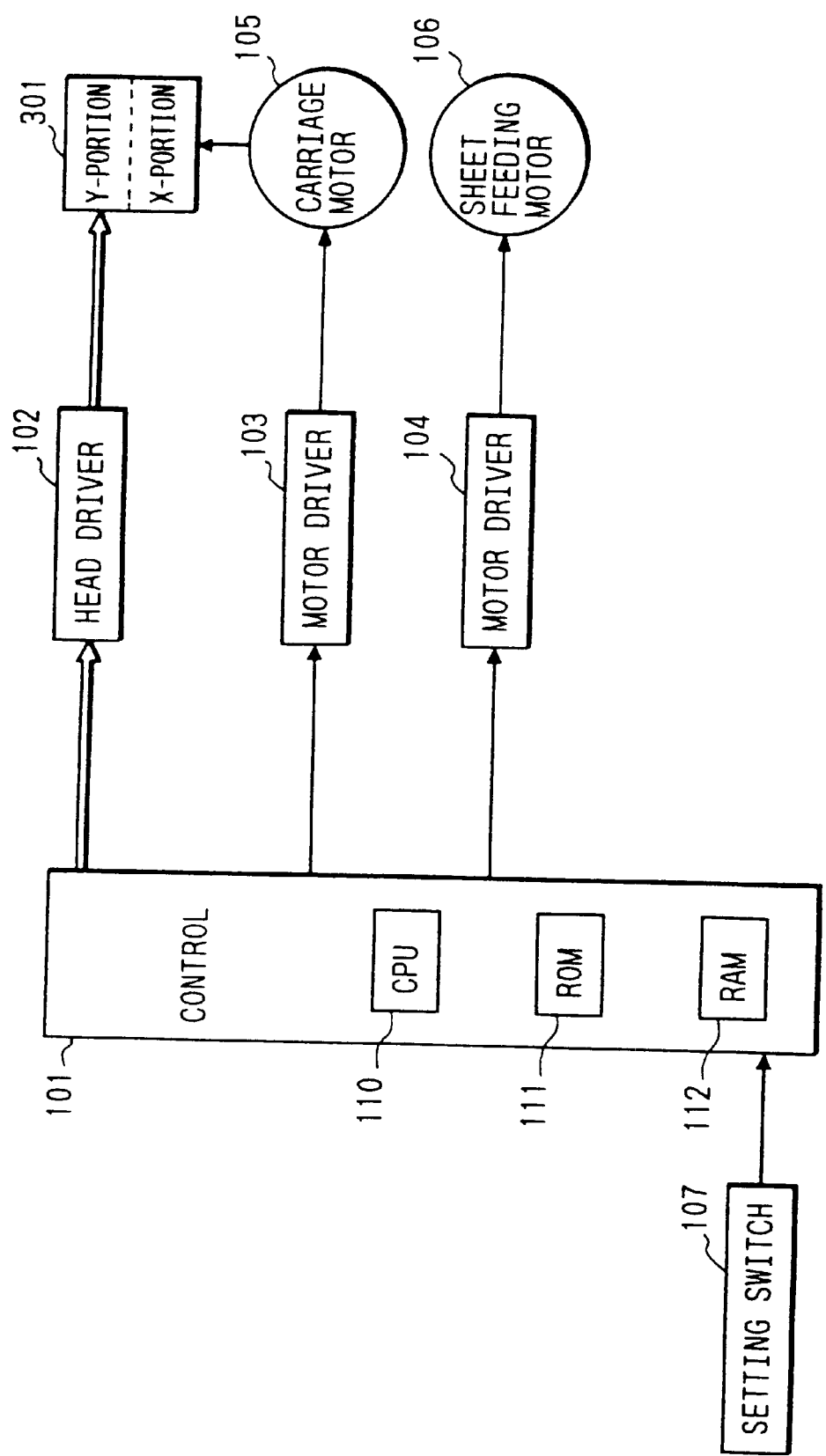
FIG. 1 is a block diagram schematically showing the structure of the principal part of a printing apparatus according to a first embodiment of the first invention.
Figure 2:
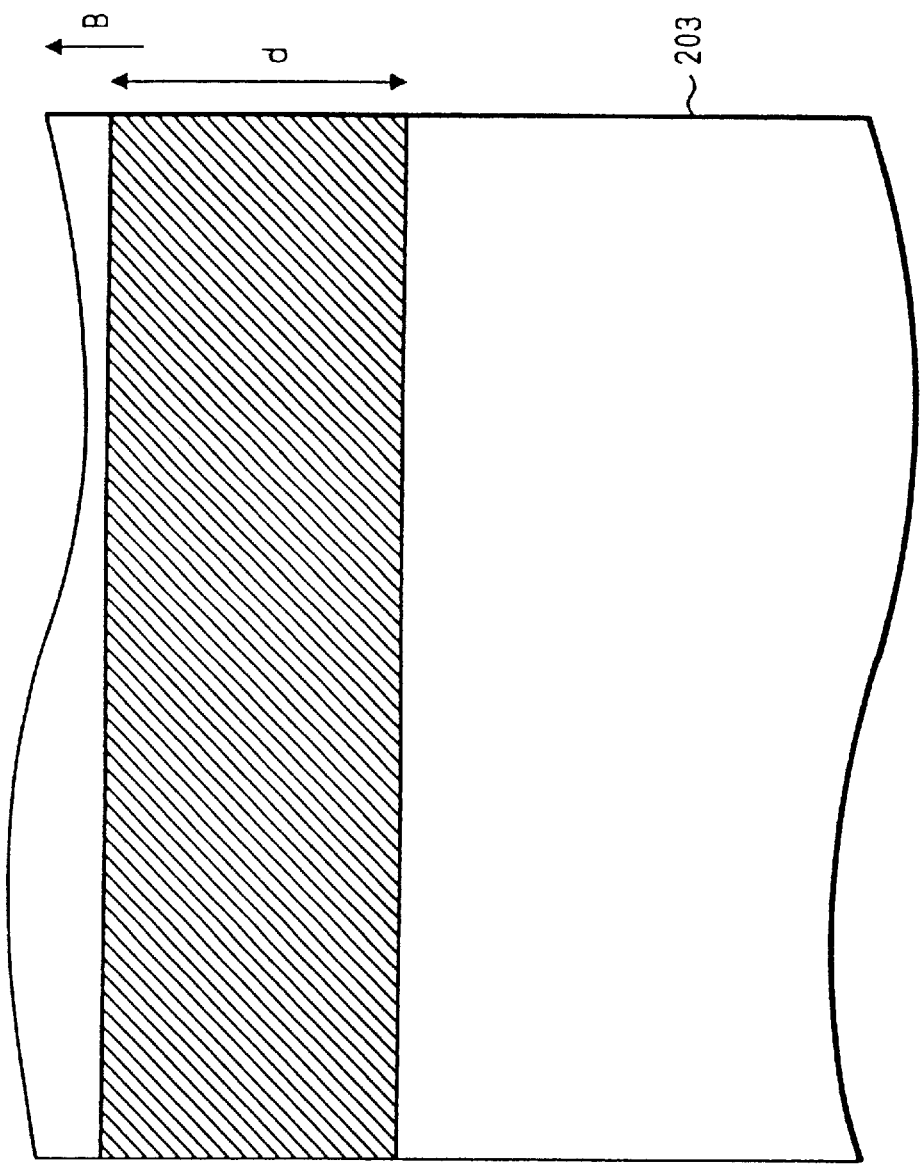
FIG. 2 is a view illustrating a recording state of a conventional recording head of a serial recording type.

FIG. 1 is a block diagram schematically showing the structure of the principal part of a printing apparatus according to the present embodiment. FIG. 4 is a flowchart showing the control process by a control unit 101 of this apparatus.

In FIG. 1, a reference numeral 101 designates a control unit which performs the overall control of the printing apparatus. This control unit comprises a CPU 110 such as a microprocessor; a ROM 111 storing the control program for the CPU 110 as represented in the flowchart shown in FIG. 4 and various data; a RAM 112 used as a work area for the CPU 110 to store various data provisionally, and others.

A reference numeral 102 designates a head driver to drive the recording head (ink jet head) 301; 103 and 104, motor drivers which drive a carriage motor 105 and a feed motor 106 to be rotated, respectively, in accordance with instructions from the control unit 101; and 107, a setting switch operated by a user to set the number of multiscannings.

The user observes the designed patterns to be printed through the monitor screen (not shown) or in the form of its original. If it is determined that this image to be printed tends to create conspicuous unevenness and streaks due to the uneven patterns thereof, or it tends to cause defective ejection from the nozzles of the recording head due to ink mist resulting from the highly densified portion in the image, the user operates the setting switch 107 to make the number of the multiscanning to be increased. A case where the multiscanning is set for two or three times will be described, for example.

Now, with reference to a flowchart shown in FIG. 4, the description will be made of the recording process by a printing apparatus according to the present embodiment.

At first, in step S1, the number of the multi-scannings set by the setting switch 107 is read, and in step S2, it is determined whether such a number is 2 or 3. Here, in this respect, a case where the number of multiscannings is 2 or 3 for the sake of convenience, but the process can be achieved in the same manner even when the numeral values are other than the numbers mentioned as a matter of course.

When the set number is 3, the sequence will proceed to step S3 to divide the nozzles of the recording head 301 shown in FIG. 3 into three. When the three-time multiscanning is performed, for example, the twelve nozzles of the ink jet head 301 are divided into three groups of 1-1 to 1-4, 1-5 to 1-8, and 1-9 to 1-12. Then, in step S4, using the nozzles 1-1 to 1-4, the first, fourth, and seventh images of the image data in the direction A are recorded at intervals of two data. This process is repeated until the recording for one scanning portion is terminated. Then, when the recording for one scanning is terminated, the sequence will proceed to step S6 in which the recording sheet 203 is shifted in the direction B for an amount of 2d/3, and the carriage is returned to the home position for a carriage return.

Subsequently, the sequence will proceed to step S7 to record the second, fifth, and eighth images of the image data in the direction A at intervals of two data using the next nozzle block 1-5 to 1-8. At this juncture, a recording is performed by the last nozzle block. Then, when the scanning for this second scan is terminated, the sequence will proceed to step S9 to shift the recording sheet 203 in the direction B for an amount of 2d/3. Thus, after a carriage return, using the nozzles 1-9 to 1-12, the third, sixth, and ninth images of the image data in the direction A are recorded at intervals of two data in steps S10 and S11. At this juncture, too, the recordings are performed by the last and one before last nozzle groups.

On the other hand, if, in the step S2, the set number is 2, the sequence will proceed to step S12 where using the nozzles 1-1 to 1-6, the data thinned by a half of the image data in the direction A are recorded at intervals of one data as shown in FIG. 3. When this one scan recording is terminated, the sequence will proceed to step S15 to shift the recording sheet in the direction B for an amount of d. Then, after a carriage return, using the nozzles 1-7 to 1-12, the remaining second, fourth, and sixth images of the image data in the direction A are recorded at intervals of one data in steps S16 and S17. At this juncture, the recording is performed by the last block.

In this way, the multiscannings are performed for the number set by the setting switch 107 to record the image data.

The number to be set by the setting switch 107 is set to increase the scanning number if there is a need for the recording pattern to acquire a further evenness or there is a higher probability of the disabled ejection due to ink mist. Now, since the user can arbitrarily set the number of multiscannings in this way in accordance with the pattern to be recorded, it is possible to obtain an evenly recorded image of a desirable quality without any disabled ejection irrespective of the patterns, at the same time enabling the recording without multiscanning if the object pattern does not require any multiscanning. As a result, there is no possibility that the recording period of time is unnecessarily prolonged.

Subsequently, the description will be made of a second embodiment according to the present invention.

Figure 5:
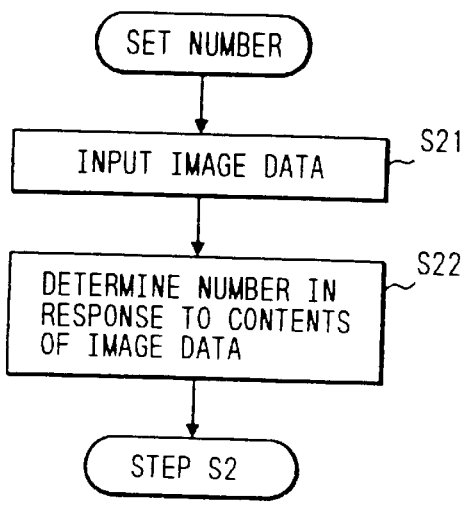
FIG. 5 is a flowchart showing the process according to a second embodiment of the first invention.

FIG. 5 is a flowchart showing the process of the control unit 101 according to the second embodiment.

In FIG. 5, when the image data are inputted in step S21 at first, the sequence will proceed to step S22 to determine the evenness of the inputted image signals and the height of the signal level by a given method. Then, if it is determined that the evenness is high and streaks and unevenness tend to be conspicuous, or the height of the signal level is high, that is, the disabled ejection tends to take place due to the mist resulting from the high density, the set value is so defined that the number of the multiscannings is increased. On the other hand, if the evenness of the image data is not so high and the height of the signal level is not so high, either, the setting is made to reduce the number of the multiscannings. In this way, the optimal number of the multiscannings is set in accordance with the evenness of the image data and the height of the signal level.

In this respect, it is possible to adopt a mode where the setting of the number of the multiscannings is performed by determining the optimal number of the multiscannings from the entire image data before printing and thereafter no change will be made, but it may be possible to arrange the setting in such a manner that an optimal number of the multiscannings is determined from the image data for one to several scanning portions and then, such a number may be modified each time.

In performing such a control as this, it is possible to form an even and beautiful image without any disabled ejection while it becomes unnecessary for the user to set the number of the multiscannings on the basis of the image data.

Now, the description will be made of a third embodiment according to the present invention. Whereas the process to set the number of the multiscannings in the foregoing second embodiment is executed by a program in accordance with the image data, the number of the multiscannings is set in the third embodiment by an image determining unit which is provided for the control unit 101 in a hardware fashion.

Figure 6:
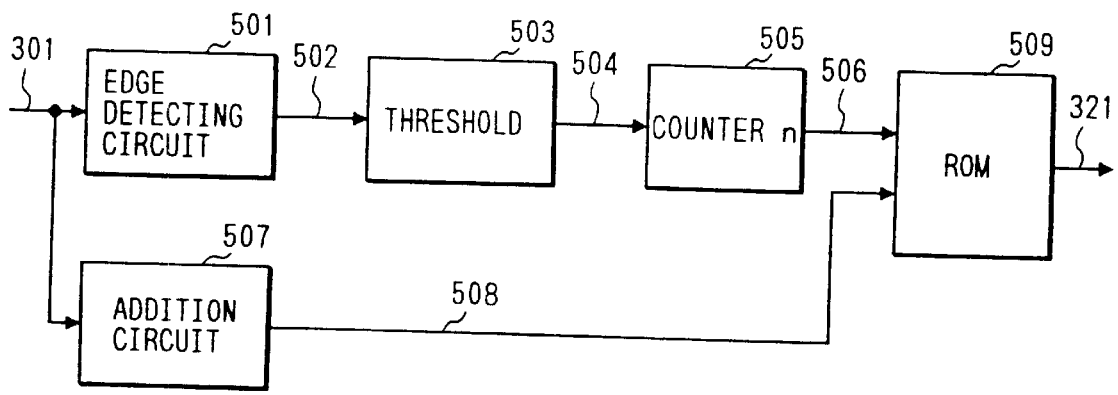
FIG. 6 is a block diagram schematically illustrating the structure of an image determining unit according to a third embodiment of the first invention.

FIG. 6 is a block diagram showing the inner structure of the image determining unit.

A reference numeral 301 designates an inputted image data; 501, an edge detecting circuit to detect the edge portion of the image data 301; 502, the edge signals output from the edge detecting circuit 501; 503, a threshold circuit to receive the edge signals 502 to determine the signal level thereof; 505, a counter to count the number of the edge signals 504 which are binary coded by the threshold circuit 503; 507, an adder; 509, a ROM; and 321, a setting value to set the number of the multiscannings.

The edge detecting circuit 501 is provided with a known differential filter circuit, and others to detect the edge portion of the image data 301; thus outputting the edge signals 502. The threshold circuit 503 outputs 1 when the absolute value of the edge signals 502 is more than a given value T and outputs 0 when it is T or less to make the edge signals binary coded. The counter 505 receives the binary coded edge signals 504 to count the number the data of which is 1, and outputs its total sum. Also, the adder 507 adds the image data 301 totally and outputs its result. The total sum 506 output from the counter 505 and the added signal 508 by the adder 507 are both inputted into the addresses of the ROM 509. The ROM 509 outputs a setting value 321 in accordance with the combination of the respective signals. In other words, given the control signal as f, counter signal 506 as C, and added signal 508 as D, the following function is obtainable:

$$f = F(C, D)$$

In the present embodiment, the counter signals 506 and added signals 508 are respectively divided into large, medium, and small to determine the setting values 321 in accordance with the combinations thereof as shown in Table 1.

TABLE 1

| Added signals 507 | Counter signals 506 | | |
|---|---|---|---|
| | Large | Medium | Small |
| Large | 2 | 3 | 4 |
| Medium | 2 | 2 | 3 |
| Small | 1 | 2 | 3 |

In this respect, the threshold values to determine these numbers, large, medium, and small, should be the optimal values that can be obtained in advance simply by the experiments.

When the counter signal 506 is large, the image data 301 has many edge portions, and determining that even portions are small, the number of multiscannings is set to be small. Also, when the added signal value 508 is small, the recording duty of the recording head is low. Thus, conceivably, there is less danger that the ink ejection defects are generated by the mist, and the number of multiscannings can be set to be small.

Figure 7:
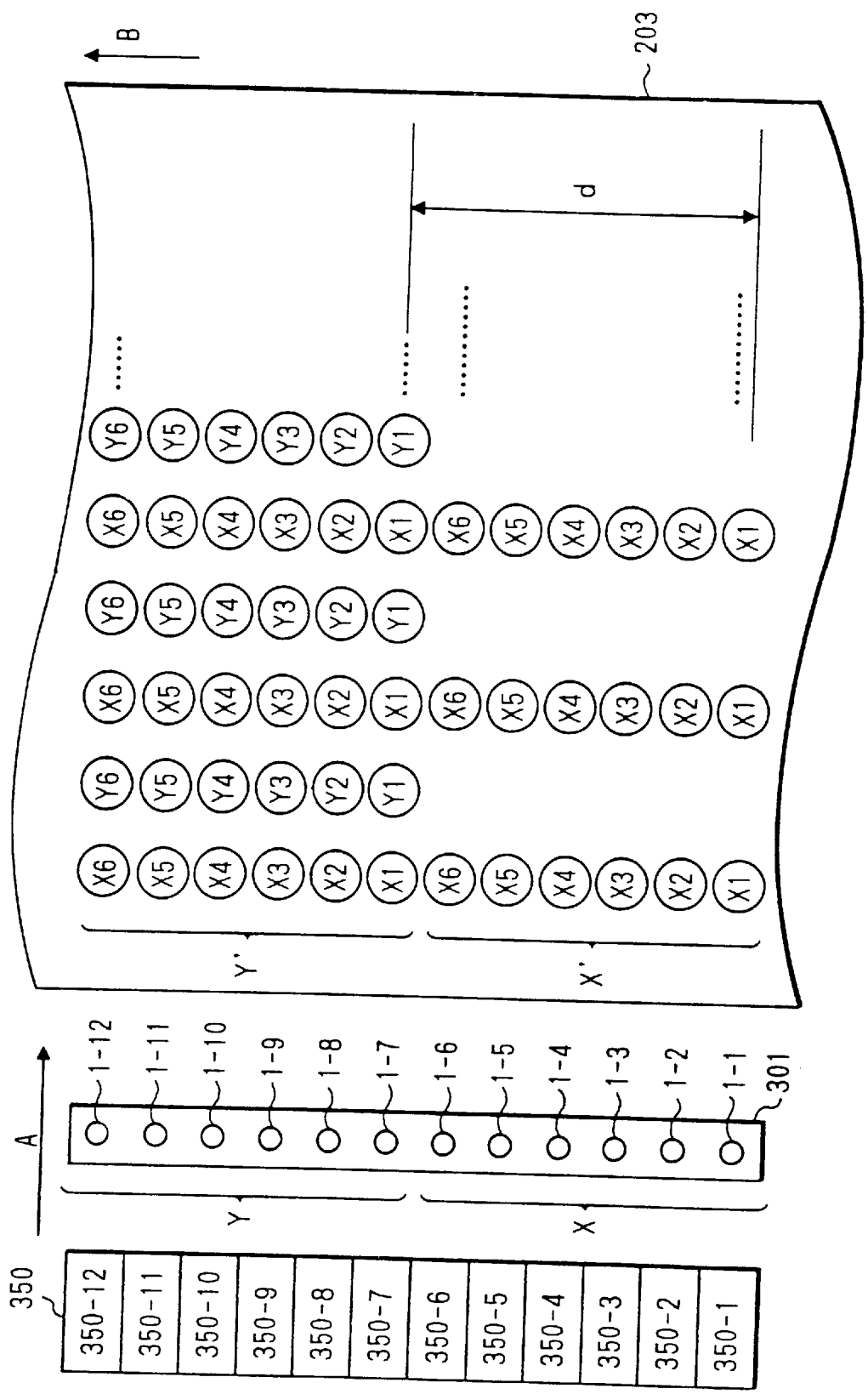
FIG. 7 is a view illustrating a multi-scanning according to another embodiment of the first invention.

Also, as shown in FIG. 7, it may be possible to set the number of multiscannings in such a manner that the image data recorded on the recording sheet 203 are read by the CCD sensor 350, and the image data are determined in accordance with the signals thus read in order to decide on the number of the multiscannings. The CCD sensor 350 shown in FIG. 7 scans following the ink jet head 301 at the same speed as the head 301 to read the recorded image. The signals read by this sensor 350 are inputted into the determining circuit instead of the image data 301 in FIG. 6, and the number of the multiscannings is decided in the same manner as in the case of the image data 301.

Here, in the foregoing embodiment, the description has been made of a case where one pixel is structured by one dot, but the present invention is executable also in a case where one pixel is constituted by plural dots and a multi-valued recording is performed in a tone corresponding to such a number of dots. In such a case, one pixel is constituted by two dots X1 and Y1 in FIG. 3, for example, and it is possible to implement this type of recording by making a ternary image formation. In this case, while it is desirable to set the interval between the X1 and Y1 dots small, the other structures are the same as the foregoing embodiment.

Here, in the above-mentioned embodiment, the description has been made of an integrally constructed ink jet head the nozzles of which are divided for use, but it may be possible to execute the multiscanning with separated heads. Also, when the separated heads are used, it may be possible to position them apart by an integer number of times the width of the sub-scan feeding in the direction of the sub-scanning.

As described above, according to the present embodiment, it is possible to obtain beautiful images stably without image unevenness, white streaks, or ink ejection defects by making variable the number of multiscannings. The recording speed is not lowered unnecessarily, either.

Hereinafter, the detailed description will be made of a second inventive concept.

FIG. 13 is a view showing an example of the image formation in a fourth embodiment according to the present invention. In FIG. 13, a reference numeral 401 designates an in jet head (hereinafter referred to as recording head) which is divided into three nozzle portions, X portion 411, Y portion 412, and Z portion 413; 402, nozzles of the recording head 401; and 403, a recording sheet. Also, a reference numeral 404 designates a CCD having four photoelectric conversion elements (reading elements) 10-1 to 10-4 arranged at the same pitches as those of the nozzles 402 of the recording head 401 to read the recorded dots from behind the recording head 401 by scanning them in the direction A at the same speed as the recording head 401. In other words, The CCD 404 reads the image recorded by the X portion 411 and detects whether any disabled ink ejection from the nozzles 402 has been generated or not. This determination of whether any disabled ink ejection exists or not is made by comparing the image data to be recorded and the reading result of the CCD 404 thus conducted.

FIG. 13 illustrates a state where the nozzles designated by X1 of the nozzles 402 are disabled to eject ink. Consequently, in the portion indicated by X' in the recording sheet 403, the dots which are supposed to be recorded by the nozzles X1 are missing. This missing of dots is detected by the pixel 10-1 of the CCD 404 which follows the recording head 401 in scanning. Then, after the termination of the recording in the portion indicated by X', the recording sheet 403 is shifted in the direction B. Then, the portion Y' is recorded by the Y portion 412 of the recording head 401. At this juncture, the dots which are not recorded by the nozzles X1 are recorded by the nozzles Y1 of the recording head 401. In this way, the missing dots due to the defective ejection of the nozzles are covered.

Figure 14:
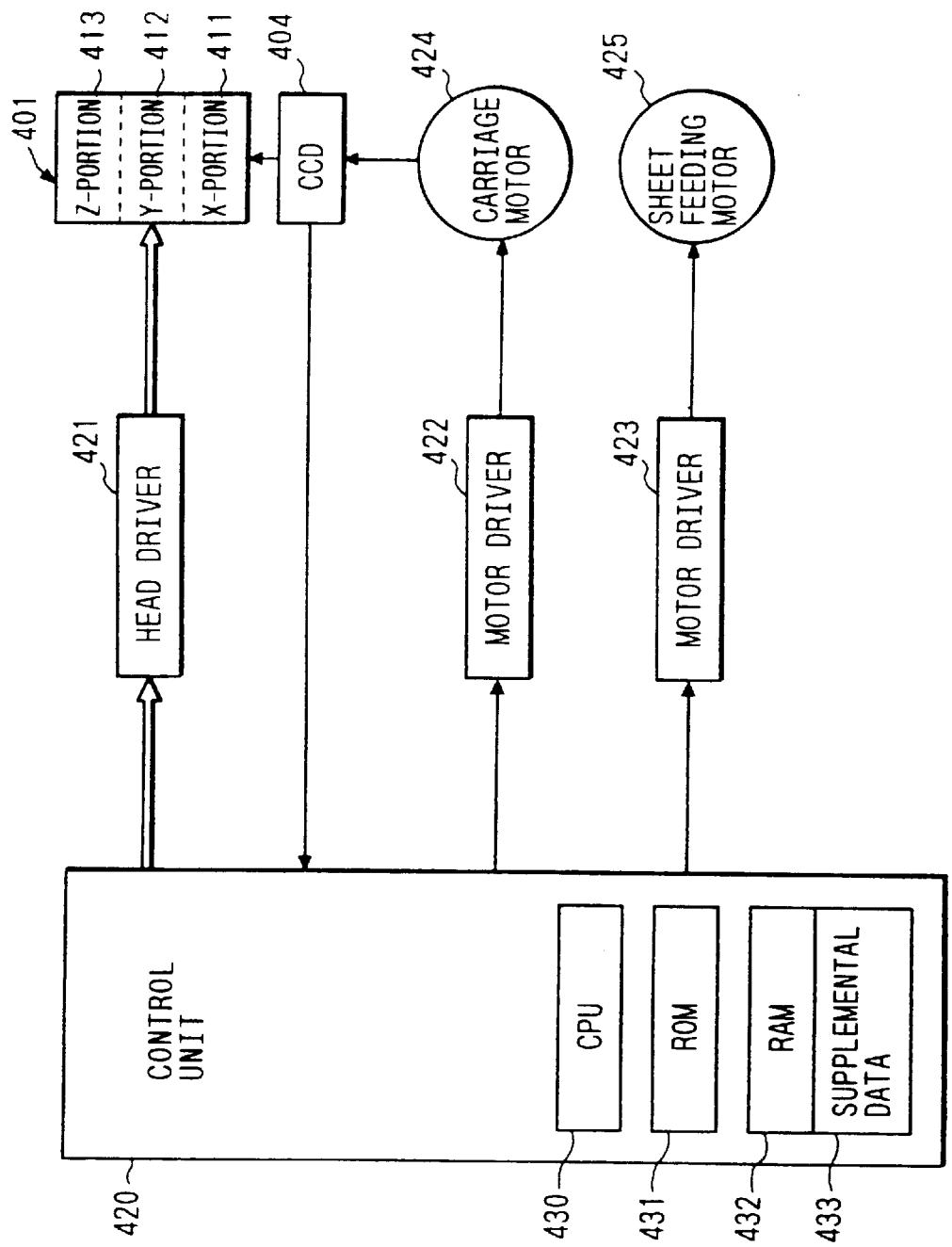
FIG. 14 is a block diagram schematically showing the structure of a printing apparatus according to the fourth embodiment of the second invention.

FIG. 14 is a block diagram schematically showing the structure of a printer according to the present embodiment. In FIG. 14, a reference numeral 420 designates a control unit to perform the overall control of the apparatus, comprising a CPU 430 such as a microprocessor, a ROM 431 storing a control program for the CPU 430 represented by the flowcharts shown in FIG. 15 and FIG. 16 as well as various data, and a RAM 432 used as the work area for the CPU 430; 421, a head driver to drive the recording head 401 in accordance with the recording data from the control unit 420; and 422 and 423, motor drivers to drive a carriage motor 424 and a feeding motor 425 to be rotated, respectively.

Figure 15:
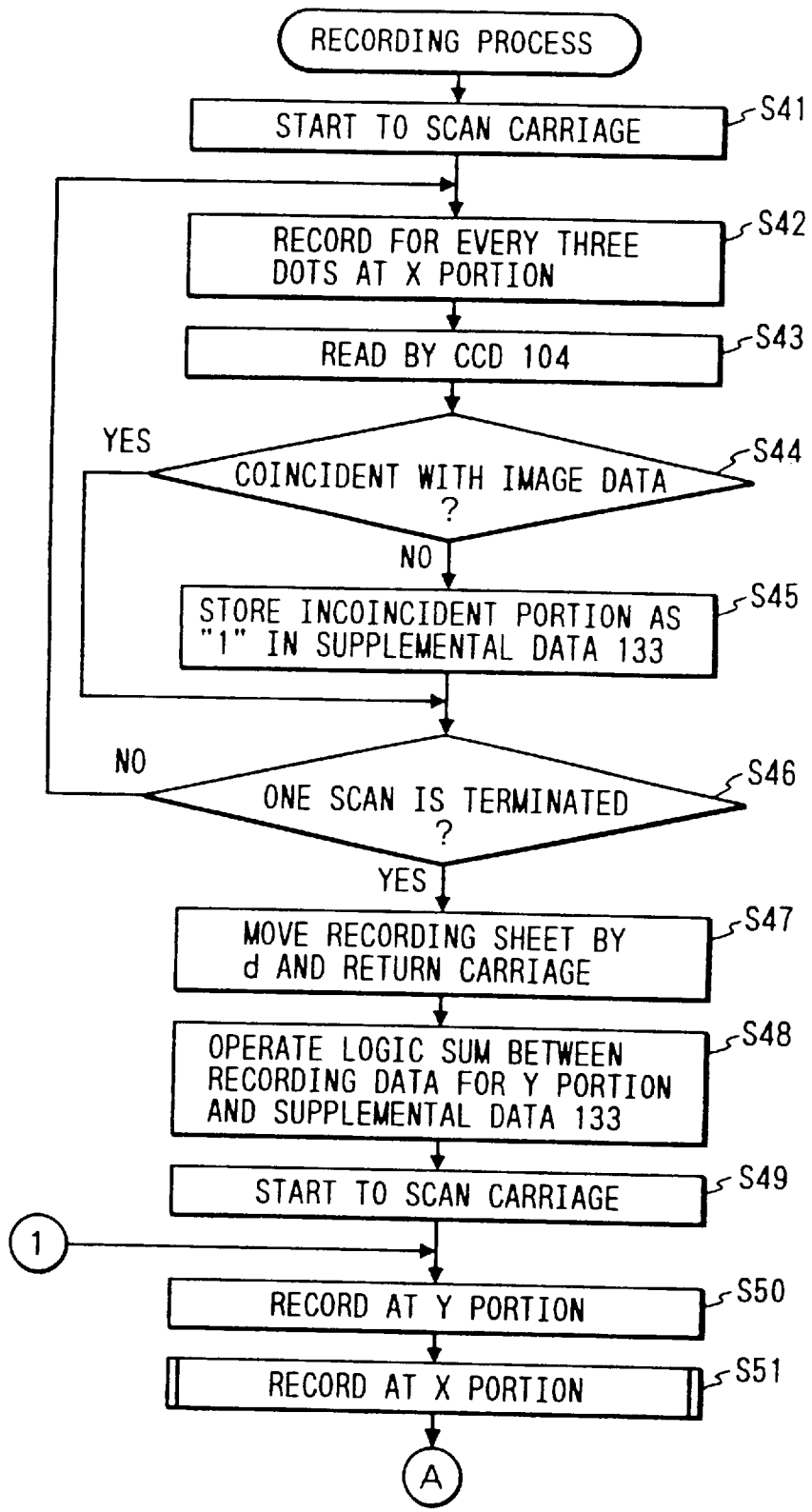
FIG. 15 and FIG. 16 are flowcharts showing the recording process in the printing apparatus according to the fourth embodiment of the second invention.
Figure 16:
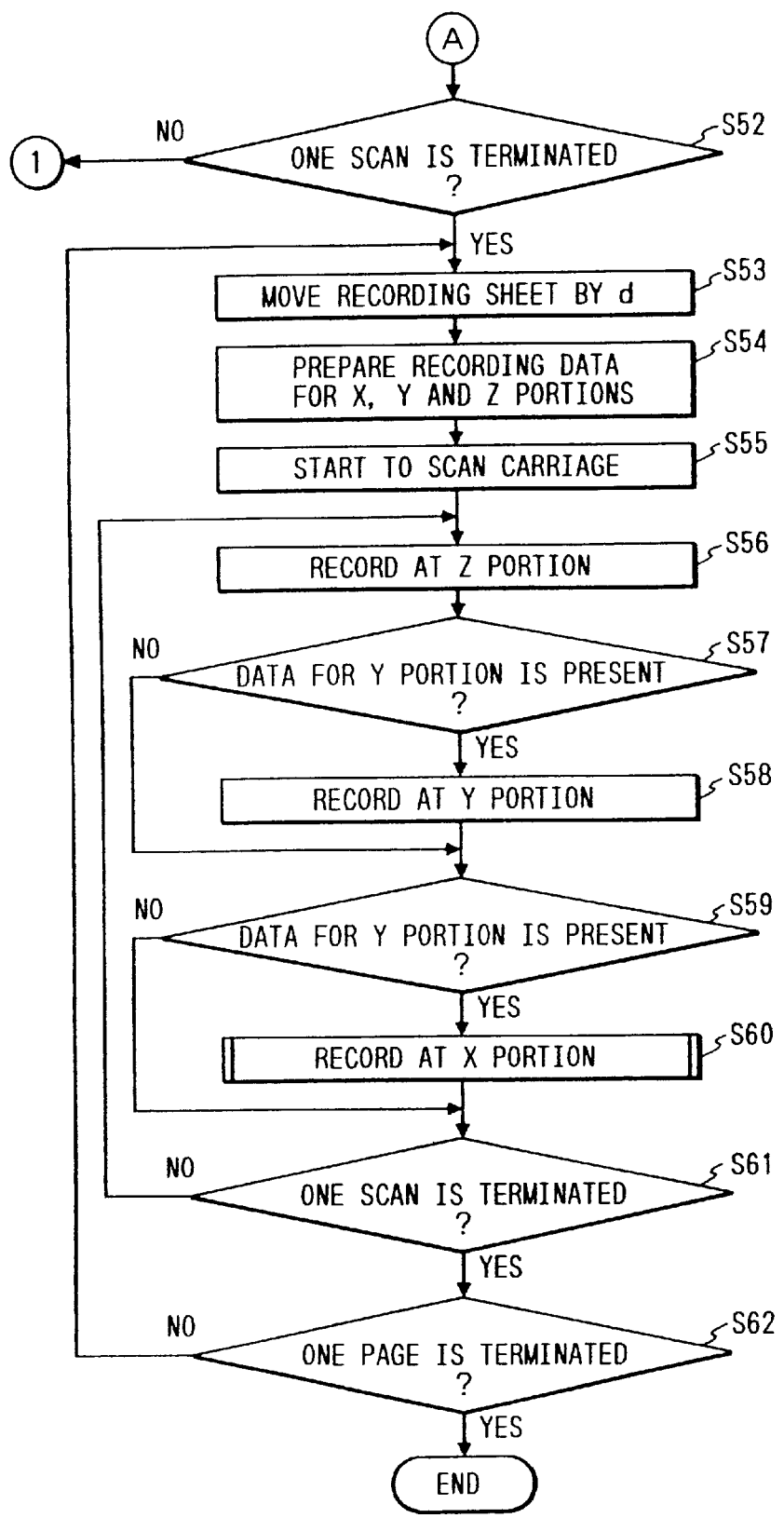

FIG. 15 and FIG. 16 are flowcharts showing the recording process of the printing apparatus according to the present embodiment. The control program for the execution of this process is stored in the ROM 431.

This process is started when a one-page portion of recording data is inputted into the printing apparatus to make the recording operation ready, for example. Then, at first, in step S41, a carriage scan is started to cause the nozzles X1 to X4 of the recording head 401 to eject ink at intervals of three dots in response to the image data in accordance with the recording data to be recorded by the X portion 411 of the recording head 401. Then, the sequence proceeds to step S43 where the dots recorded by this X portion 411 on the recording sheet 403 are read by the CCD sensor 404 which is engaged in scanning following this recording head 401. Then, if the dots actually recorded and the image data to be recorded are not coincident, such a portion is designated as 1 and recorded in the complementary data area 433 of the RAM 432 (step S45). In this respect, this complementary data area 433 is all cleared to zero at the beginning. Thus, in step S46, whether the recording process for one scanning is terminated or not is examined, and if not terminated, the sequence will return to the step S42 to repeat the foregoing process.

When the recording of the one scanning portion is terminated, the sequence will proceed from step S46 to S47 to cause the recording sheet 403 to be shifted in the direction B by d. The carriage will return to its home position. Then, in step S48, the logic sum of the recording data for the Y portion 412 of the recording head 401 and the data stored in the complementary memory 434 is operated to make such a sum a recording data to perform recording in the Y portion 412. At this time, the contents of the complementary data 434 are again cleared to zero. Then, in step S49, the carriage scan is started. In step S51, the nozzles in the Y portion 412 of the recording head 401 are driven at intervals of three dots to perform recording in accordance with the recording data produced in the step S48. In parallel with this, the recording by the X portion 411 is also performed in the step S51. This recording process by the X portion 411 is the same as the process executed in the foregoing steps S42 to S45.

When the one scanning recording is terminated in this way, the sequence will proceed from step S52 to S53 to conduct the carriage return and shift the recording sheet 403 by d. Then, the recording data to be recorded by the X portion 411, Y portion 412, and Z portion 413 are produced (step S54). At this Juncture, the logic sum of the recording data by the Y portion 412 and the contents of the complementary data 434 are operated in the same manner as described in the forgoing step S48. Then, the other data are produced by the recording by the use of each part of the recording head 401, and when it is terminated, the sequence will proceed to step S55 to start the carriage scan in the same manner as described earlier. Then, in steps S56, S58, and S60, the recording is performed using each part of the recording head 401. In this respect, the determination of the presence of the recording data in step S57 and step S59 is based on the examination of the last termination of the recording data for the X portion 411 and Y portion 412 because the recording of the recording data is terminated only when the recording in the Z portion 413 is also terminated. Hence, the steps S56 to S61 are repeated until the one scanning recording is terminated in the step S61, and lastly, in step S62, the foregoing steps S53 to S62 are repeatedly executed until one page recording process is terminated. In this respect, the recording process by the X portion 411 in the step S60 is the same as the process represented in the steps S42 to S45 as in the process in the step S51 as described earlier.

As described above, even when the nozzles of defective ink ejection exist in the X portion 411 of the recording head 401, it is possible to record the dots corresponding to such nozzle portion by the use of the other nozzles in the subsequent recording process.

Now, with reference to FIG. 17, the description will be made of a fifth embodiment according to the present embodiment.

Figure 17:
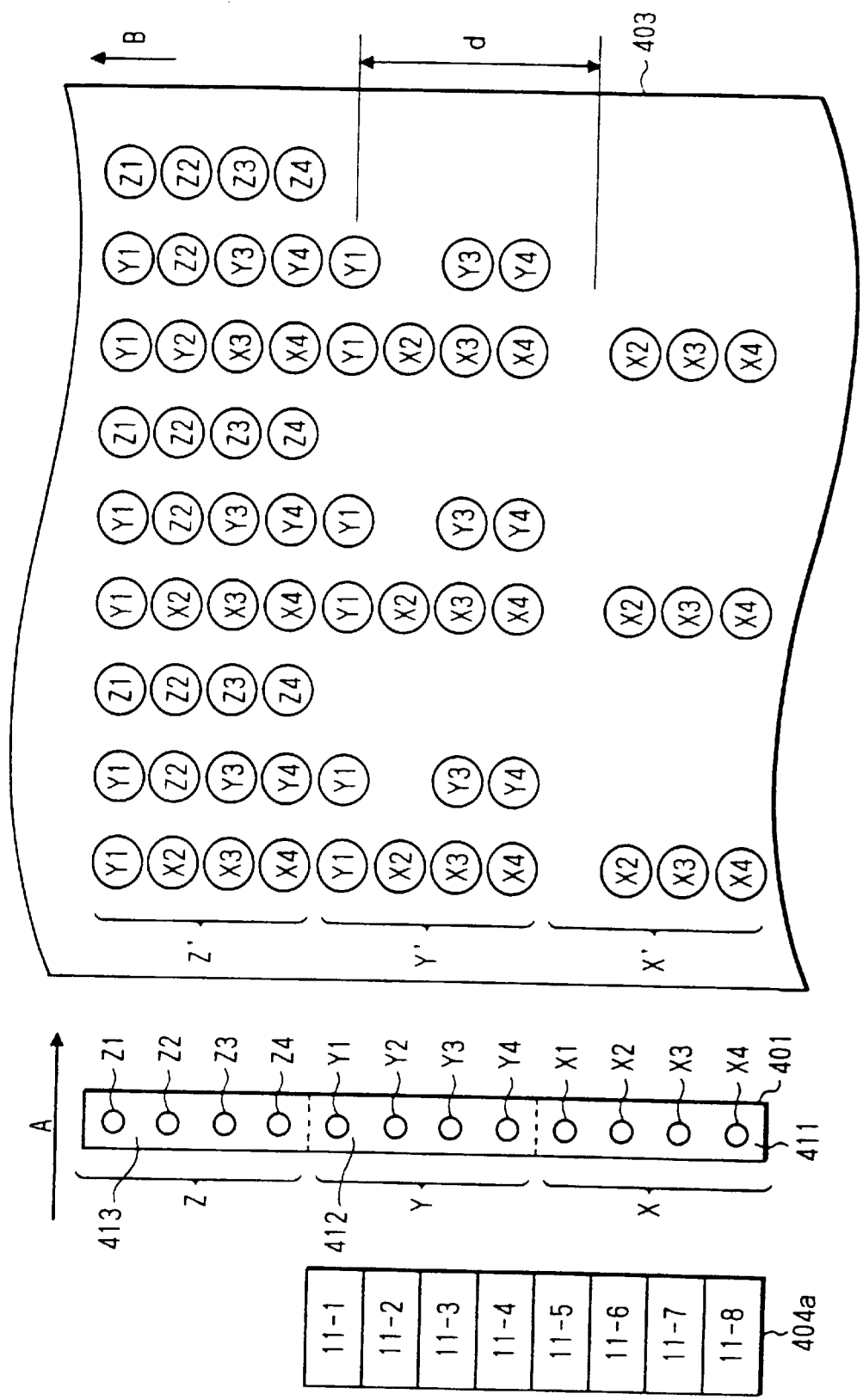
FIG. 17 is a view illustrating the recording operation of a fifth embodiment of the second invention.

FIG. 17 is a view illustrating the fifth embodiment, in which the same reference numerals are given to the same structures and parts as described earlier and the descriptions thereof will be omitted. In this fifth embodiment, a CCD 404a has photoelectric conversion elements (reading elements) for an eight-pixel portion and is capable of detecting eight dots recorded by the X portion 411 and Y portion 412 of the recording head 401 at a time. Of this CCD 404a, the four pixels designated by 11-5 to 11-8 read the image recorded by the X portion 411 of the recording head 401 to detect whether any defective ink ejection exists or not in such portion. FIG. 17 illustrates a case where the nozzle X1 of the recording head 401 is in a state of defective ejection. In this case, the CCD 404a detects the portions where the dots are missing, and when the recording is performed next by Y portion 412 of the recording head 401, the dots missed by the nozzle X1 for recording will be recorded by the nozzle Y1 to complement such dot missing by the nozzle X1. The reading elements represented by 11-1 to 11-4 of the CCD 404a read the dots in the Y' portion which are recorded by the Y portion 412 of the recording head and compare the image data to be recorded by the X portion 411 and Y portion 412 of the recording head 401 and the reading result of dots by the CCD 404a to determine whether any nozzles showing defective ejection exist or not. FIG. 17 illustrates a case where the nozzle Y2 of the Y portion 412 is in a state of defective ejection. In such a case, the dots missed by the nozzle Y2 of the Y portion 412 are recorded using the nozzle Z2 of the Z portion 413 of the recording head 401 after the recording sheet 403 has been shifted in the sub-scanning direction by d; thus performing the recording by complementing the missing dot portion in such a manner.

The operation in this case is such that in addition to the inspection on the recorded dots conducted at the time of recording by the X portion 411 of the recording head 401 in the foregoing FIG. 15 and FIG. 16, another process to inspect the recorded dots by the Y portion 412 of the recording head will be conducted, and that the portion where dots are missing can be complemented in the recording process by the use of the Y portion 412 and Z portion 413 of the recording head 401. This implementation is easy, and here, the description of the flowchart for such operation will be omitted.

Subsequently, with reference to FIG. 18, the description will be made of a sixth embodiment according to the present invention.

Figure 18:
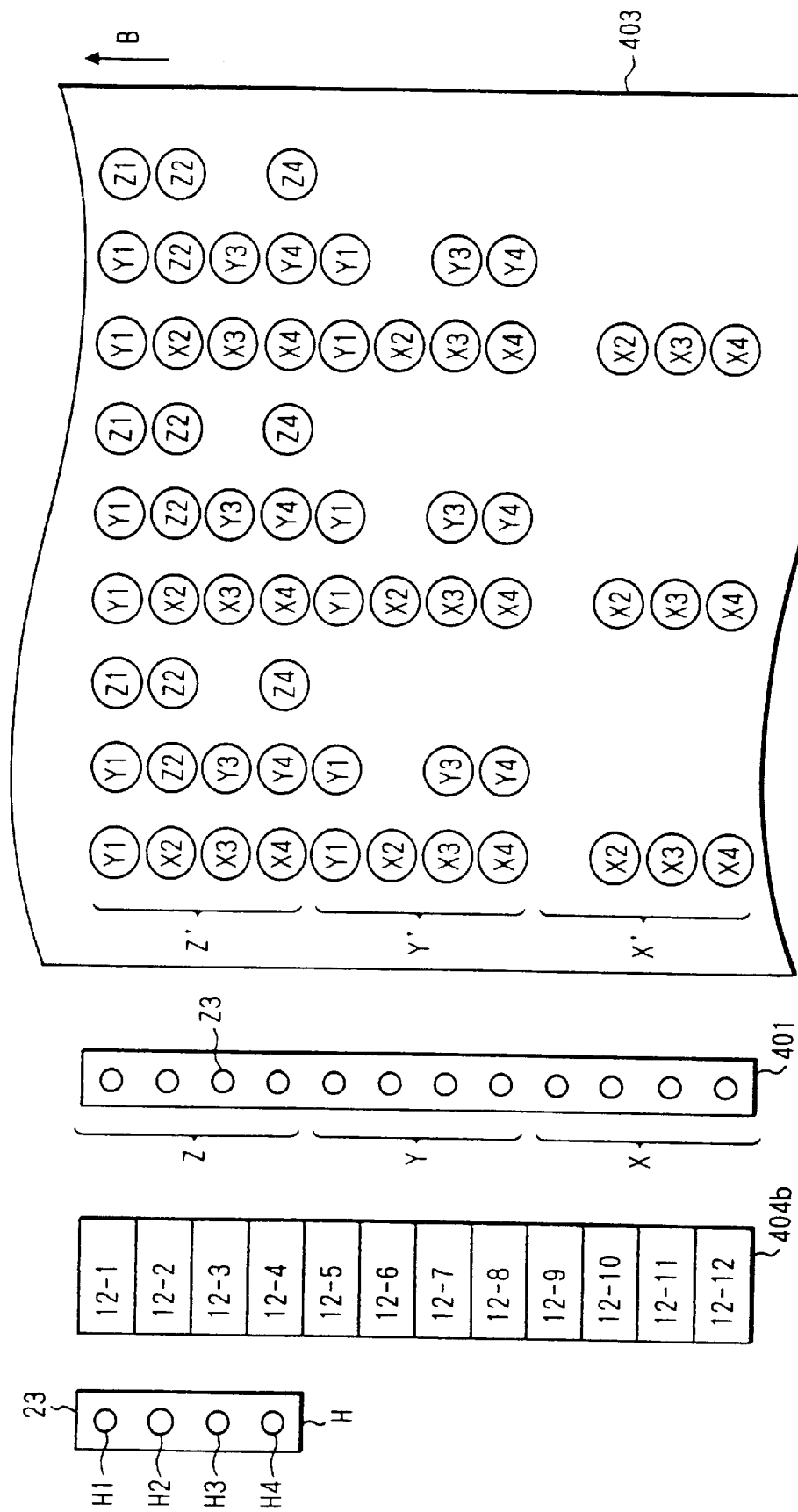
FIG. 18 is a view illustrating the recording operation of a sixth embodiment of the second invention.

FIG. 18 is a view illustrating the sixth embodiment, in which a CCD 404b has twelve reading elements represented by 12-1 to 12-12. Of these reading elements, the elements designated by 12-1 to 12-4 read the dots recorded by the Z' portion on a recording sheet 403. Then, whether any dot missing is generated or not is detected by comparing the image data to be recorded on this portion and the data thus read; hence producing the image data to complement this. Then, using a head H which is arranged behind this CCD sensor 404b, the image data for the portion where any dot missing has taken place will be recorded. FIG. 18 illustrates a case in which the nozzle Z3 in the Z portion of the recording head 401 is in a state of defective ejection, and this is complemented with the recording by the nozzle H3 of the recording head H.

Figure 19:
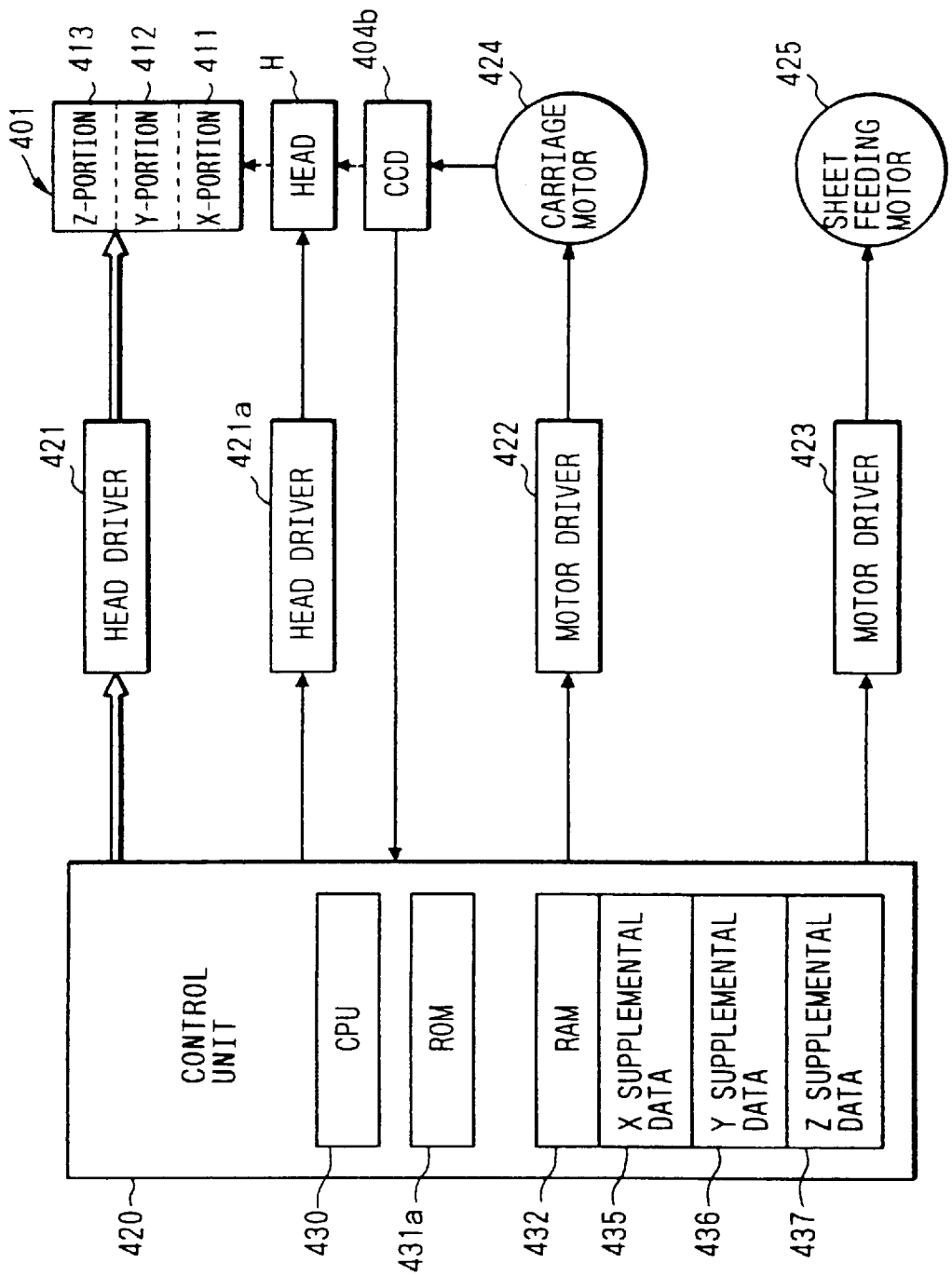
FIG. 19 is a block diagram schematically showing the structure of a printing apparatus according to the sixth embodiment of the second invention.

FIG. 19 is a block diagram schematically showing the structure of a printing apparatus according to this sixth embodiment, in which the same reference numerals are given to the portions corresponding to those in the foregoing block diagram shown in FIG. 14, and the descriptions thereof will be omitted. In this printing apparatus, a CCD sensor 404b, a recording head 401 and another recording head H are mounted on the carriage, and are integrally shifted by the rotational driving of a carriage motor 424. Also, in a RAM 432 in a control unit 420, there are provided an X complementary data 435 to store the dot data which are not recorded in the X' portion, a Y complementary data 436 to store the data which are not recorded in the Y' portion, and a Z complementary data 437 to store the data which are not recorded in the Z' portion.

Figure 20:
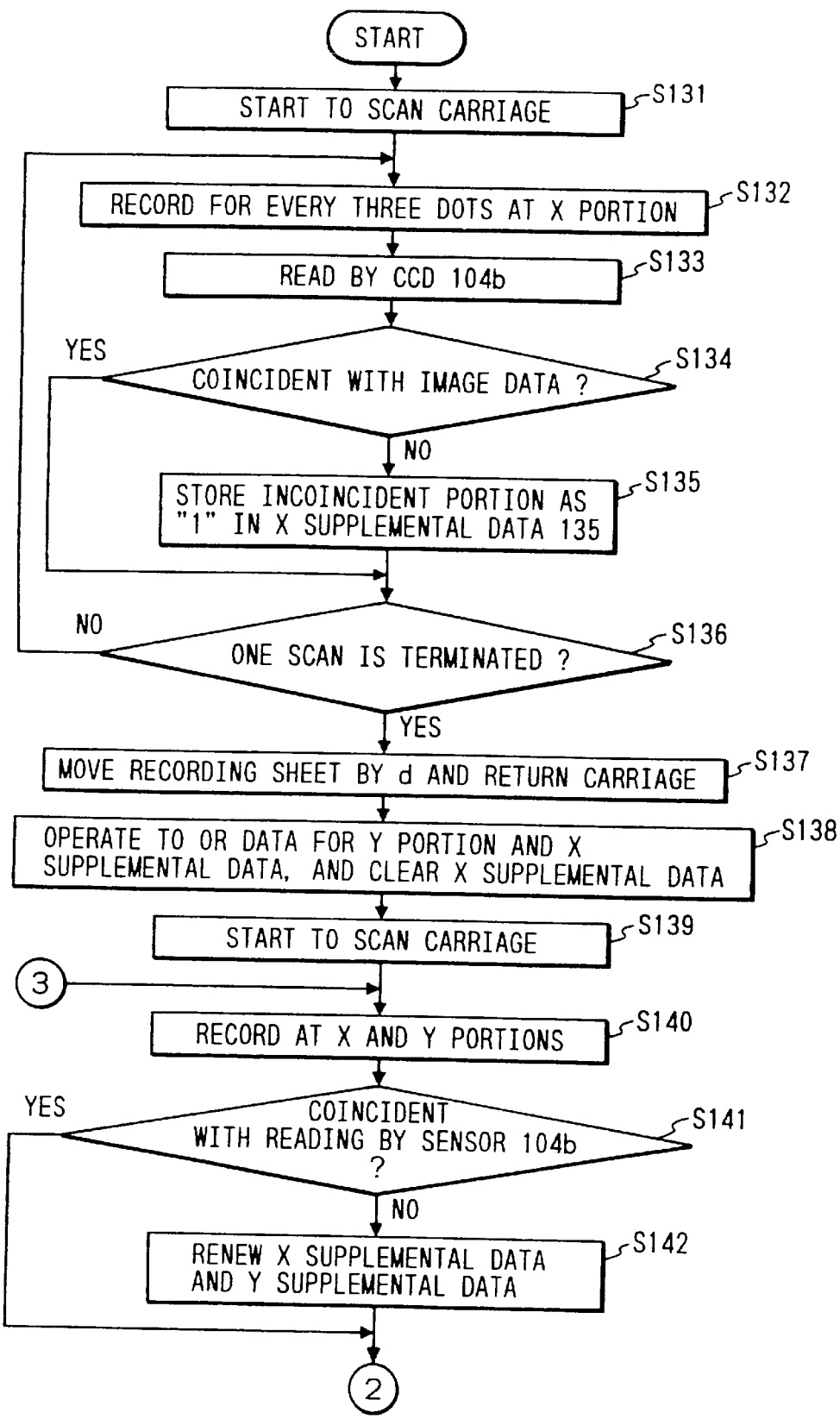
FIG. 20 and FIG. 21 are flowcharts showing the recording process in a printing apparatus according to the seventh embodiment of the second invention.
Figure 21:
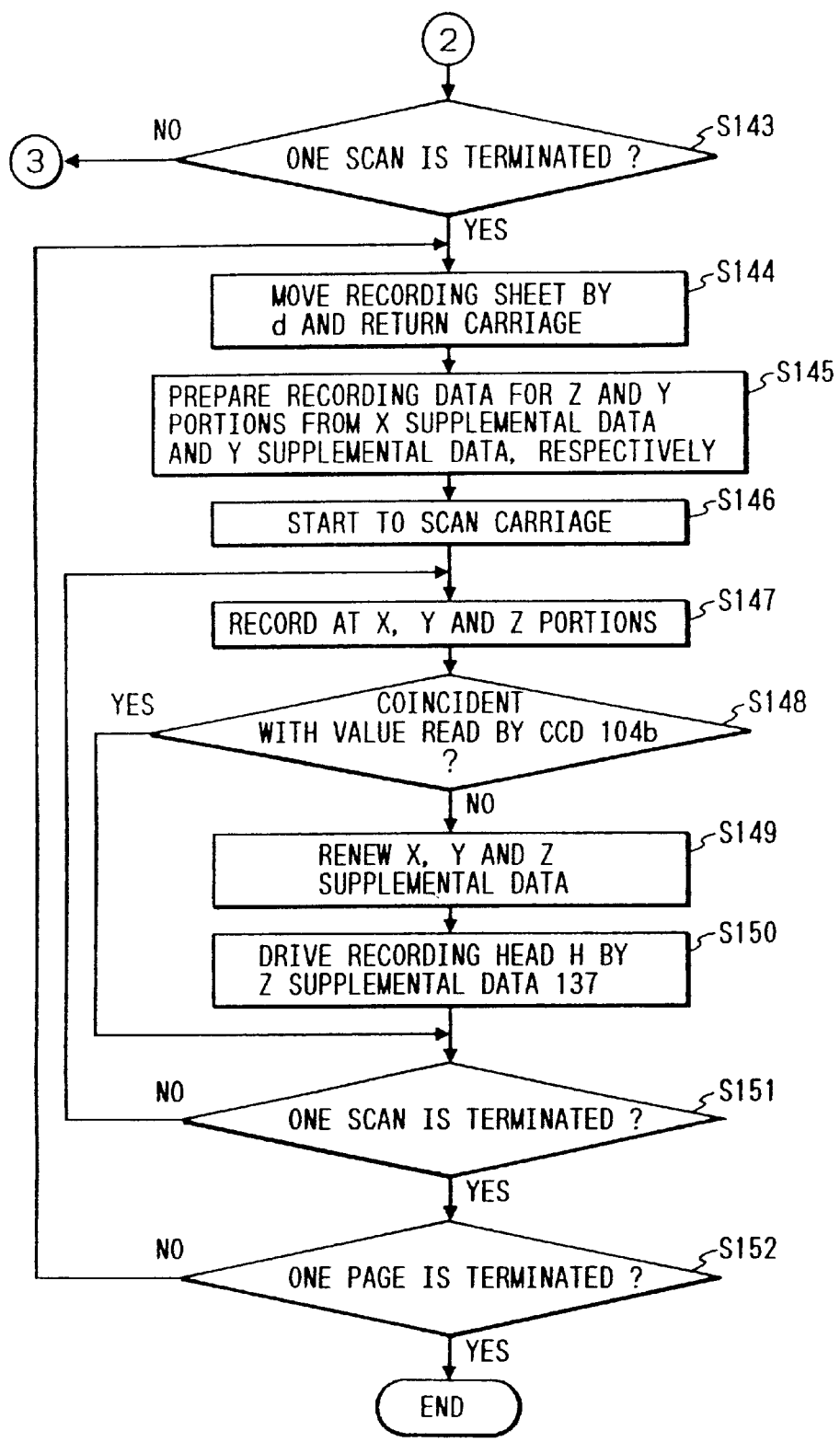

The operation of the printing apparatus according to the sixth embodiment is shown in flowcharts shown in FIG. 20 and FIG. 21. Hereinafter, with reference to the flowcharts, the operation of this printing apparatus will be described briefly.

The recording process by the X portion of the recording head 401 shown in steps S131 to S137 are the same as the steps S41 to S47 in the foregoing flowchart shown in FIG. 15. Therefore, the description thereof will be omitted. The sequence will proceed to the next step S138 where the logic sum of the data to be recorded in the Y portion of the recording head 401 and the data stored in the X complementary data 435 is operated to produce the recording data which will be output to the Y portion of the recording head 401. Then, the sequence will proceed to step S140 to perform recording by the use of the X portion and Y portion of the recording head 401, and determine whether the dots recorded on a recording sheet 403 and the recording data output to the X portion and Y portion are coincidental or not on the basis of the signals from the CCD 404b (step S141). If found to be incoincidental, the sequence will proceed to step S142 where such incoincidental portion is stored in the X complementary data 435 if it is in the portion X' on the recording sheet 403 or stored in the Y complementary data 436 if it is in the portion Y'.

Thus, in step S143, when the recordings in the X' portion and Y' portion are completed, the sequence will proceed to step S144 to shift the recording sheet 403 in the direction B by d and return the carriage to its home position.

Then, in the next step S145, the recording data to be recorded by the Z portion and Y portion of the recording head 401 are produced in accordance with the recording data which should originally be recorded and the contents of the X complementary data 435 and Y complementary data 436. Thus, in step S146, the carriage scan is started for the next record scanning, and in step S147, the recordings are performed by the X portion, Y portion and Z portion of the recording head 401. Then, in step S148, the dot data read by the CCD 404b and the recording data are compared. If any incoincidental portion is found in the X' portion of the recording sheet 403 on the basis of the result of the comparison, such portion will be stored in the X complementary data 435 or if it is found in the Y' portion, such portion will be stored in the Y complementary data 436. Then, if such portion is present in the Z' portion, the Z complementary data 437 will be updated. Thus, the sequence will proceed to step S150 where the contents of the Z complementary data 437 are output to the recording head H. The final complementary recording will be performed by the recording head H accordingly.

With a structure such as this, the probability to cover the state of the disabled ink ejection from the nozzles of the recording head 401 will be further improved. For example, the dots to be recorded by the X portion of the recording head 401 will never be missed unless the nozzles of the X portion, Y portion, Z portion of the recording head 401 and of the recording head H, which are in the same position, are all disabled to eject ink.

Now, the description will be made of a seventh embodiment according to the present invention. In this seventh embodiment, if the nozzle X1 of the X portion 411 of the recording head 401 is detected by the CCD sensor 404 and found to be in a state of defective ink ejection in the foregoing FIG. 13, for example, it is determined that the probability is high for the occurrence of the disabled ejection due to ink mist.

Subsequently, the description will be made of a seventh embodiment. In this seventh embodiment, if it is detected by the CCD sensor 404 that the nozzle X1 of the X portion 411 of the recording head 401 is in a state of defective ink ejection in the foregoing FIG. 13, for example, the probability is determined to be high for the generation of the disabled ejections due to ink mist. Thus, the driving condition of the recording head 401 is changed. In other words, according to this seventh embodiment, the driving frequency f for the recording head 401 is lowered. If, for example, the recording head 401 has been driven at 2.5 kHz so far, this driving frequency is reduced to 2.0 kHz. Accompanying this, the scanning speed of the recording head 401 in the direction A is also reduced.

Then, in the same manner as the foregoing fourth embodiment, the dots missed by the nozzle X1 are recorded by the use of the nozzle Y4 when the recording is performed by the Y portion 412 of the recording head 401 after the recording sheet 403 has been scanned in the sub-scanning direction (direction B). In this way, any missing dots are complemented. In this respect, the driving frequency and the main scanning speed of the recording head 401 at that time remain in the lowered conditions as described above.

The structure of the printing apparatus in this case is the same as the one represented by the blocks shown in FIG. 14, and if the dot data read by the CCD sensor 404 are not coincidental with the data to be recorded in the flowcharts in FIG. 15 and FIG. 16, the revolution of the carriage motor 424 is lowered in the step S45 to implement the reduction of the driving frequency of the recording head 401.

Also, in a case represented by FIG. 17, too, if any incoincidental dots exist in the same manner as the foregoing fifth embodiment, the driving frequency of the recording head 401 is lowered. Thus, the revolution frequency of the carriage motor 424 is lowered to attain the same arrangement as in the foregoing seventh embodiment.

According to the present embodiment, there is an advantage that no defective ink ejection will take place in the X portion 411 of the recording head 401, and even if some take place at the time of recording by the Y portion 412, a proper countermeasure will be taken. Also, if any defective ink ejection has occurred in the X portion 411 of the recording head 401 and despite the driving frequency of the recording head 401 being lowered, the defective ink ejection should occur again in the Y portion 412 in the following recording process, it is possible to lower the driving frequency of the recording head 401 further and record the missing dots by the X portion 411 and Y portion 412 when the recording is performed by the Z portion 413.

Figure 22:
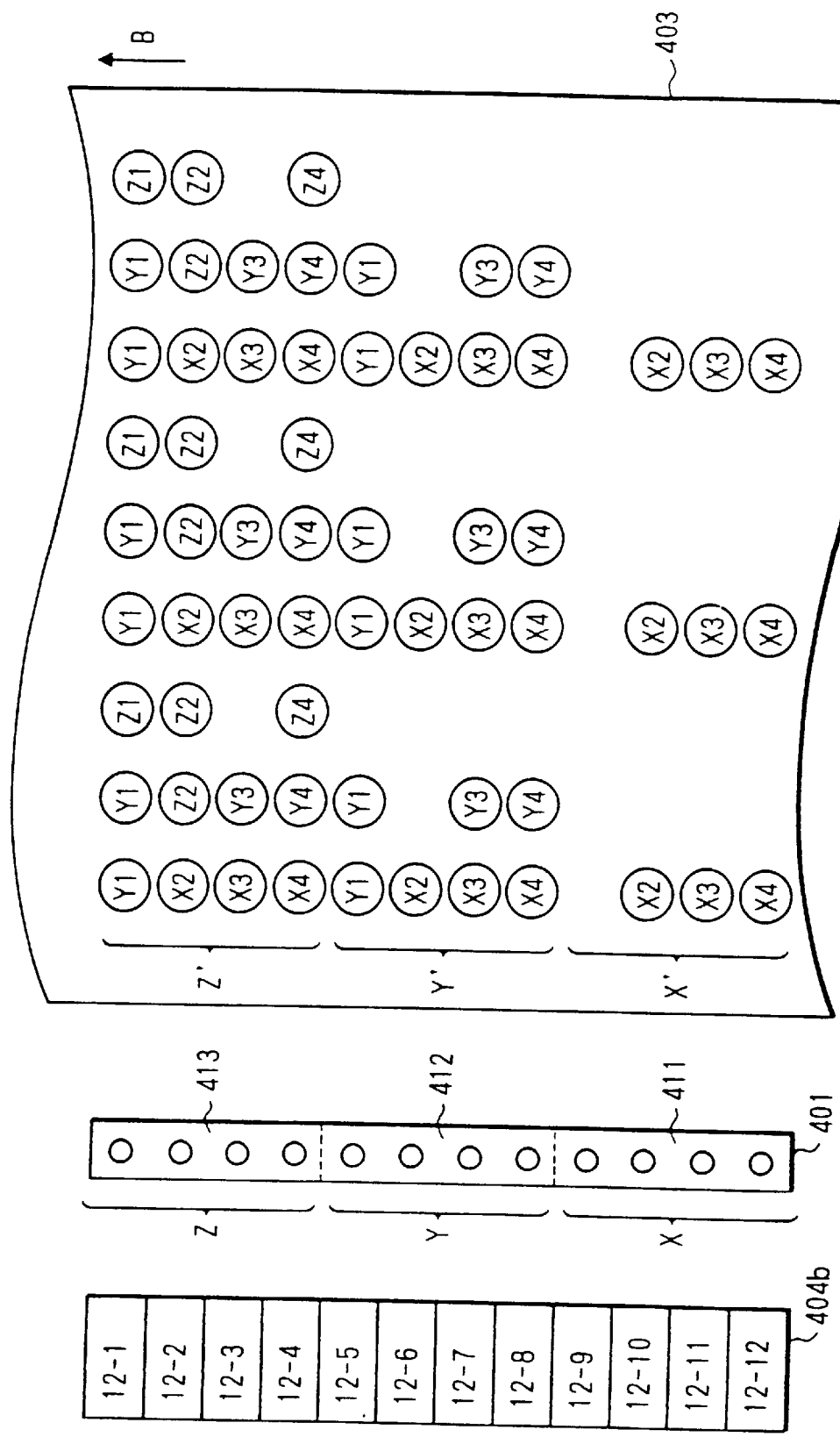
FIG. 22 is a view illustrating the recording operation of a printing apparatus according to an eighth embodiment of the second invention.

FIG. 22 is a view illustrating an eighth embodiment according to the present invention. In this eighth embodiment, a CCD 404b has twelve reading elements 12-1 to 12-12 as in the foregoing FIG.18. Of the reading elements, those represented by 12-1 to 12-4 read the dots recorded on the Z' portion of the recording sheet 403 and compare them with the image data to be recorded; thus detecting the presence of the portion where dots are missing. If any missing dots are found, a warning signal is output. Here, in this case, it may be possible to provide a recording head H to follow as in the case of the foregoing FIG. 18, and a recording process by such recording head H may be conducted in such a manner that the driving frequency of the head H is lowered to reduce the driving frequency of the carriage motor 424 for the required recording, for example.

As described above, according to the seventh and eighth embodiments, if any defective ink ejection takes place by the scanned recording, it is possible to suppress the defective ink ejection due to ink mist by reducing the driving frequency of the recording head.

Now, the description will be made of a ninth embodiment according to the present invention. In this ninth embodiment, the ratio between the density value of the recorded image data and the density of the recorded dots (the density detected by a CCD 404) is obtained to correct the output data to each of the nozzles of the recording head 401 in accordance with such a ratio.

In a case represented in FIG. 11, it is assumed, for example, that the density of the recorded dots read by the CCD sensor 404 is given as $D_o$, and the recording density estimated from the recording data corresponding to such density is given as $D_i$, and the estimated recording density is estimated in such a manner that when the value of the inputted image data is 80H (H stands for hexadecimal), its recording density is estimated as 0.75 in a case of a printing apparatus where the maximum recording density becomes 1.5 when the maximum value of the image data is FFH, for example.

Then, when the ratio $D_o/D_i$ between the density of the actual recording and the density of the image data is obtained, the control unit 420 modifies on the basis of this ratio the image data adjacent to this pixel for the recordings are performed by the Y portion 412 and Z portion 413 of the recording head 401.

Figure 23:
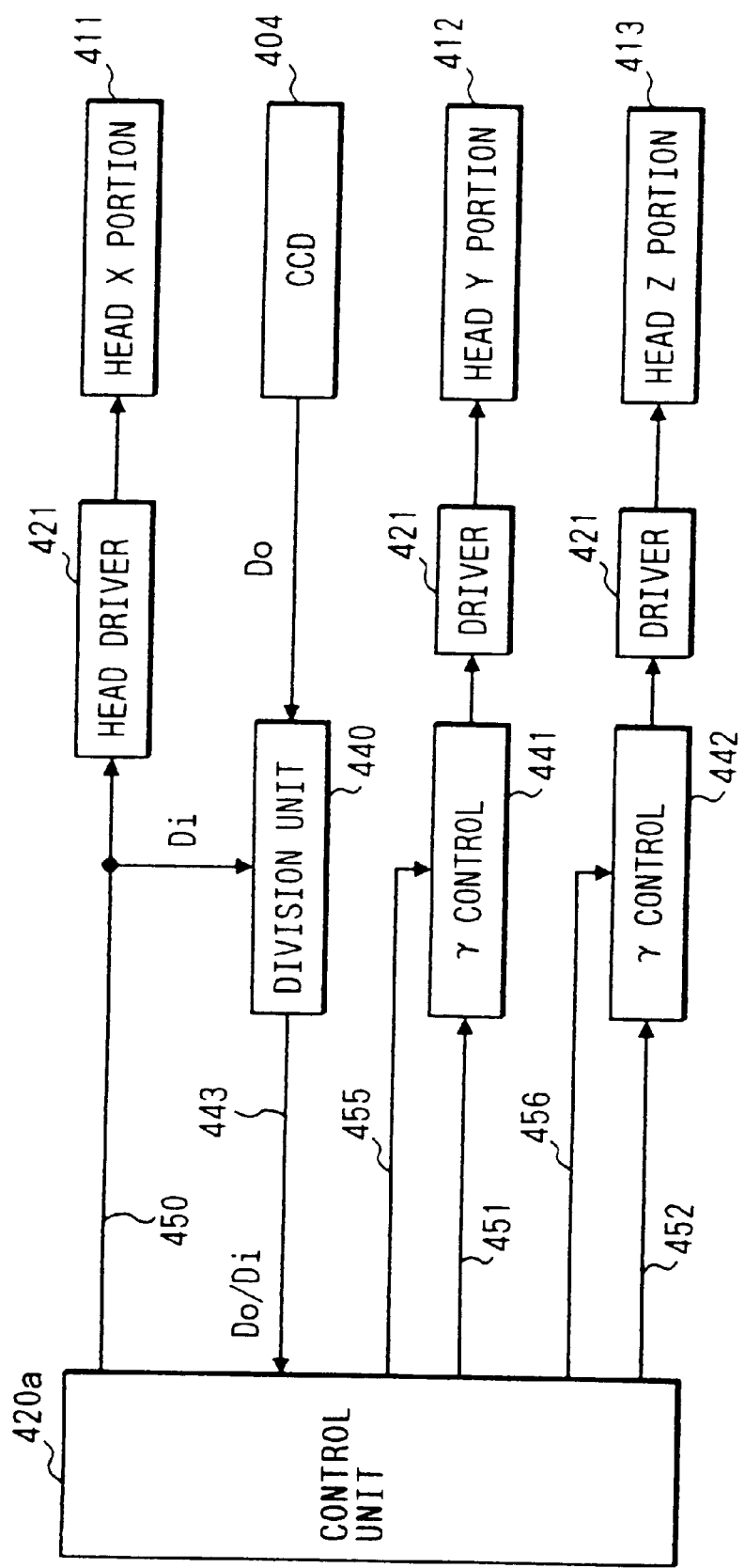
FIG. 23 is a block diagram showing the structure of the principal part of a printing apparatus according to a ninth embodiment of the second invention.

FIG. 23 is a block diagram showing the structure of a control circuit for a printing apparatus according to the ninth embodiment, in which the same reference numerals are given to the portions common with those appearing in the foregoing block diagram shown in FIG. 14.

A reference numeral 440 designates a division unit to calculate the ratio $D_o/D_i$ between the actually recorded density and the density of the image data; and 441 and 442, γ control units, respectively, to modify the image data to be output to the Y portion 412 and Z portion 413 of the recording head 401 in accordance with the control signals from the control unit 420a. Now, a case of $D_i$=1.0 and $D_o$=1.1 will be considered, for example. Then, the ratio $D_o/D_i$ becomes 1.1. The recording is performed at a density which is higher than the estimated density by 10%. Here, each of the image data 450, 451, and 452 is the portion of the final image data which are divided into three equal portions. Therefore, the recording duty of the recording head 401 for each of the X portion, Y portion, and Z portion is substantially equal. As a result, the temperature rise of the recording head 401 is substantially equal. Hence, if the recording is performed each by the Y portion 412 and Z portion 413 of the recording head 401 without any correction, the recorded density is higher than the estimated density by 10% as in the case of the recording in the X portion 411.

Therefore, when the recording is performed using the Y portion 412, the image data is multiplied by 1/1.1 (=0.91). Then, the image density to be recorded by the Y portion 412 of the recording head 401 can be equalized to the estimated density. Only with this, however, the dots already recorded by the X portion 411 will remain as they are. Consequently, when the recording is performed using the Z portion 413, the image data to be recorded is multiplied by 0.82 (0.9×0.91) to enable the recorded density to be 0.9 times the estimated density. The recording will be performed on the basis of such image data. As a result, the averaged density of the recorded portions by the X portion 411, Y portion 412, and Z portion 413 will be (1.1+1.0+0.9)/3=1.0; hence making it possible to obtain the recorded density which is substantially equal to the estimated density.

A process such as this is executed by the control unit 420a. In other words, the control unit 420a calculates the image data for the Y portion 412 and Z portion 413 as described above and outputs the control signals 455 and 456 to the γ control units 441 and 442 of the Y portion 412 and Z portion 413.

Figure 24:
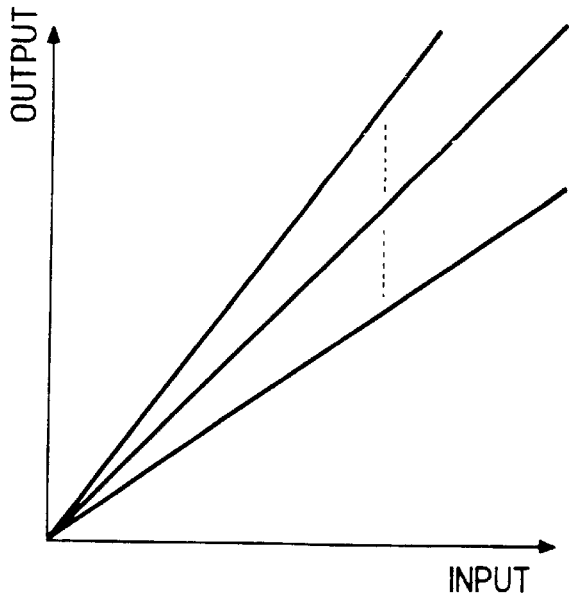
FIG. 24 is a view showing the γ correction characteristics in the γ control unit of a printing apparatus according to the ninth embodiment of the second invention.

FIG. 24 is a graph showing the data stored in these γ control units 441 and 442. As shown in FIG. 24, the straight line look up table having the inclinations which differ by 0.01 each are stored for 64 lines. Then, the straight lines of the corresponding characteristics are selected in accordance with the control signals 455 and 456, and the inputted image data 451 and 452 are converted for output. Thus, according to the above-mentioned example, the characteristic corresponding to the straight line having an inclination of 0.91 is selected by the control signal 455 in the γ control unit 441, for example. In the γ control unit 442, the characteristic corresponding to the straight line having a inclination of 0.82 is selected.

With a control such as this, the recorded density is always controlled to be coincidental with the estimated density corresponding to the image data even if the fluctuation of the recording density is generated by the temperature rise of the recording head 401 and the like. It is thus possible to obtain an evenly recorded image as an image finally output without a density fluctuation.

Figure 25:
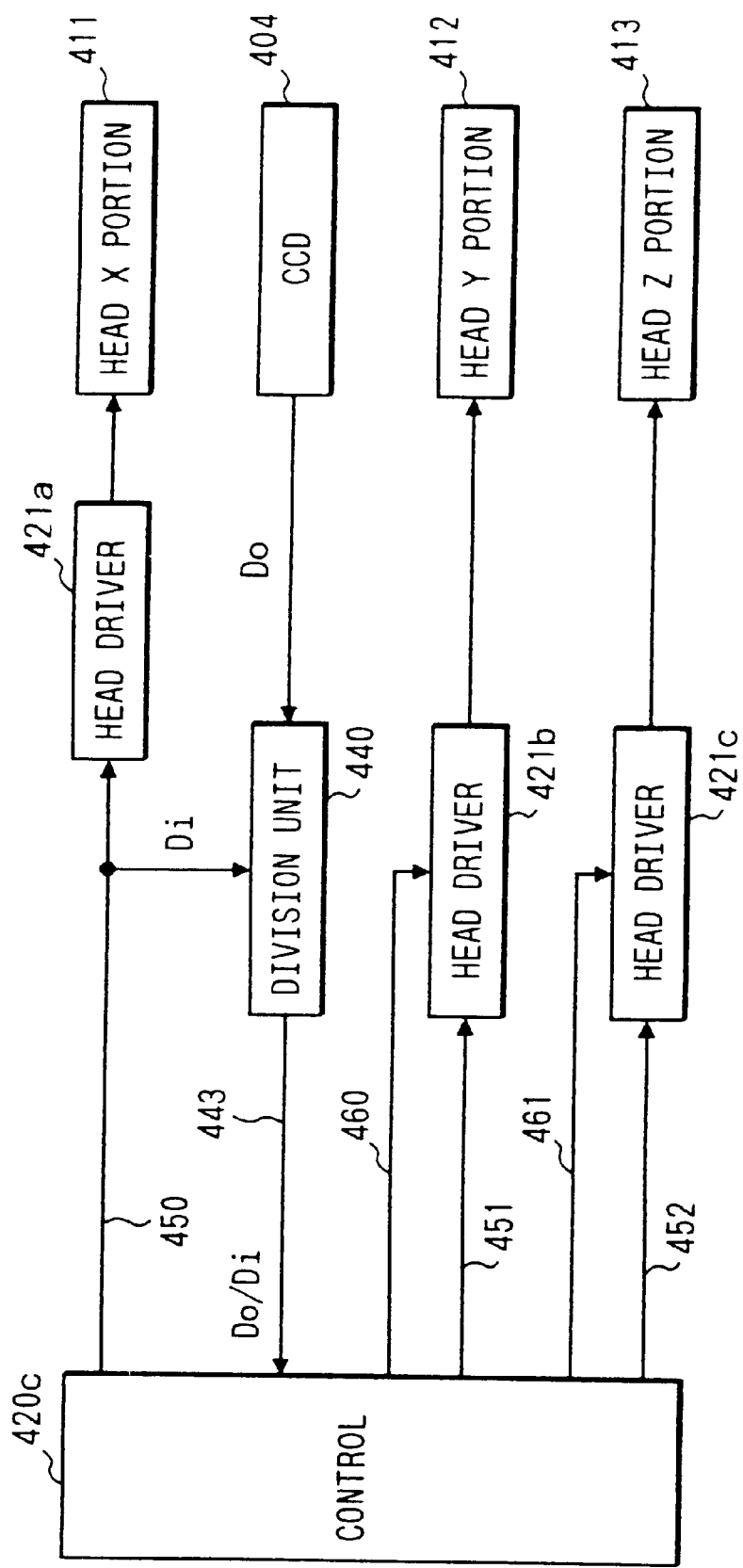
FIG. 25 is a block diagram showing the structure of the principal part of a printing apparatus according to a tenth embodiment of the second invention.

FIG. 25 is a block diagram illustrating a tenth embodiment according to the present invention, in which the driving voltage for a recording head 401 head is controlled by head drivers 421b and 421c in accordance with a density ratio $D_o/D_i$. In FIG. 25, each of the portions 411 to 413 of the recording head 401 is capable of controlling the amount of ink ejection in response to the driving voltage. The relationship between this head driving voltage and the density of an image to be recorded is stored in a control unit 420c. Therefore, the control unit 420c can output the control signals 460 and 461 to drive each of the head drivers 421b and 421c on the basis of the ratio ($D_o/D_i$) inputted by a division unit 440. Hence, as in the foregoing ninth embodiment, it is possible to adjust the density of the image to be recorded by the recording head 401, thereby to suppress the fluctuation of the recorded density.

Also, besides this, it may be possible to arrange the structure so that the fluctuation of the recorded density is suppressed by changing the head driving pulse width of the head drivers 421b and 421c by the use of the control signals 460 and 461.

Subsequently, with reference to FIG. 26, the description will be made of an eleventh embodiment according to the present invention.

Figure 26:
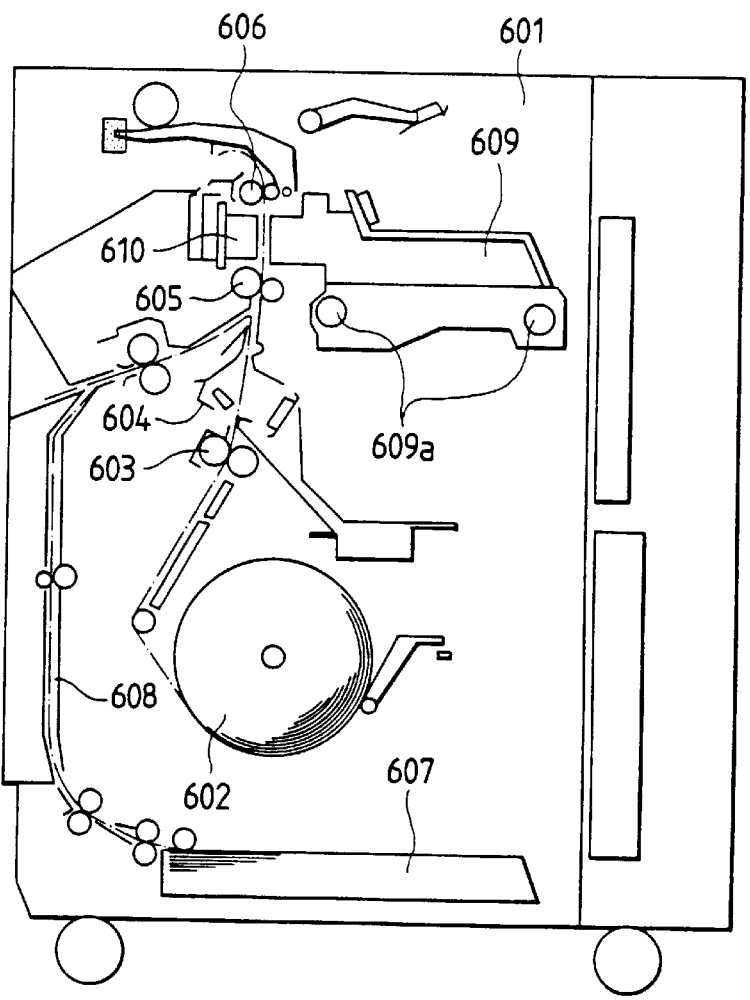
FIG. 26 is a cross sectional view showing a recording apparatus according to an eleventh embodiment.

FIG. 26 is a cross sectional view of a printing apparatus (recording apparatus) according to the present embodiment. In this respect, while the description will be made of a recording apparatus which is used as an ink jet printer in this eleventh embodiment, the structure of this recording apparatus 601 is applicable to the foregoing embodiment.

In FIG. 26, a reference numeral 601 designates the recording apparatus body; 602, an elongated roll as a recording member (a recording medium such as a recording sheet); 604, a cutter to cut the recording member by a given length; 603 and 605, a pair of feeding rollers, respectively, to feed the rolled sheet; and 606, a sub-scanning roller to convey and position the recording member exactly for a given length corresponding to the recording width of a recording head. With the above constituents, a conveying path is structured for the recording member being supplied from the roller 602.

On the other hand, a reference numeral 607 designates a recording sheet cassette to stock the cut sheets of the recording member; 608, a guide unit to guide and feed the recording member wherein the recording member drawn and conveyed from the cassette 607 is being fed through the guide unit 608 to meet the conveying path from the foregoing roller 602 immediately before the feeding roller 605; 609, a carriage with the recording head mounted thereon, which is supported movably in the depth direction in FIG. 26 by a pair of main scanning rails 609a; and 610, a platen arranged in a position opposite to the carriage 609 to pinch the recording member, which is capable of keeping the recording member flat by preventing it from being raised in recording, at the same time having means of absorption such as an air suction or an electrostatic absorption board to prevent the recording member to be in contact with the recording head.

Now, with reference to FIG. 27, the periphery of the recording head will be described.

The carriage 609 comprises recording heads 609C, 609M, 609Y, and 609Bk for cyanogen, magenta, yellow, and black, respectively. A reference numeral 611 designates an ink supply system to supply ink to each of the recording heads 609C, 609M, 609Y, and 609Bk, and is provided with the ink cartridges 611C, 611M, 611Y, and 611Bk for cyanogen, magenta, yellow, and black, respectively. Each of these ink cartridges supplies ink to each of the recording heads 609C, 609M, 609Y, and 609Bk by a pump which is not shown through tubes 612C, 612M, 612Y, and 612Bk, respectively; 613, a carriage motor to drive the carriage 609 to scan in the main scanning direction (in the left and right directions in FIG. 27), which drives the carriage 609 to be carried through the pulleys 614, 615, and a belt 616 fixed to the aforesaid motor 613; and 617 is a motor to drive the ink supply system 611 to scan in the main scanning direction (in the left and right directions in FIG. 27) in synchronism with the carriage 609, which drives the ink supply system 611 to be carried through a driving pulley 618, a pulley 619, and a belt 620 fixed on the aforesaid motor 617.

A reference numeral 622 designates a recording member such as the foregoing rolled sheet or cut sheet to be fed in the upper direction in FIG. 27 by the carrier roller 605 and the sub-scanning roller 606, and 623, a capping member positioned to perform a process (hereinafter referred to as ejection recovery process) to remove the causes to lower the image quality. The nozzle surfaces of the recording heads 609C, 609M, 609Y, and 609Bk are covered by the aforesaid capping member 623. In this state, the ink ejection by driving the recording heads or ink exhaust by pressure from the recording head nozzles are performed. Further, a high speed airflow is introduced to the surfaces of the recording head nozzles in the capping member 623 to blow off from the nozzle surfaces the remaining ink, dust particles, fluffs, and the like accompanying the foregoing ink ejection. The nozzle surfaces are thus cleaned to eliminate the disabled or uneven ejection. A reference numeral 631 designates a monitor unit arranged on the carriage 609 on the immediately downstream side of the recording head group in the main scanning direction (in the right hand direction in FIG. 27) to read the recording state recorded by the recording heads 609C, 609M, 609Y, and 609Bk.

Figure 28:
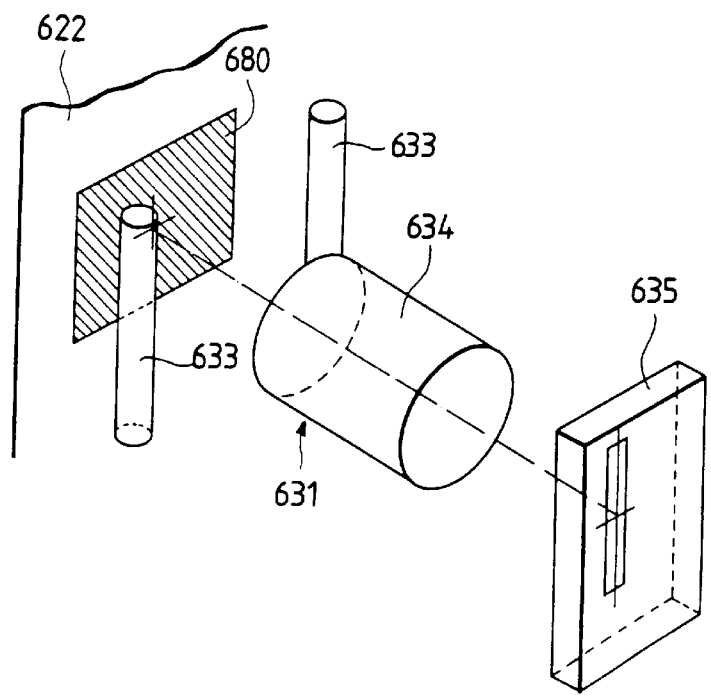
FIG. 28 is a perspective view illustrating the monitor unit of an recording apparatus according to the eleventh embodiment.

Now, with reference to FIG. 28, the structure of the monitor unit 631 will be described in detail. In FIG. 28, a reference numeral 633 designates a pair of illuminating lamps to illuminate a recording image 680; 634, a lens to receive the reflective rays from the recording image 680 illuminated by the illuminating lamps 633; and 635, a CCD or another type of sensor to convert the recording image 680 photoelectrically in accordance with the incident light of its reflection through the lens 634. The CCD sensor 635 divides one pixel into three approximately. It also has filters of blue, green and red to monitor the recording image 680 as a chromatically resolved image. Also, the number of the reading elements of this CCD sensor 635 should desirably be more than the number of recording elements (the number of nozzles) of the recording heads 609C, 609M, 609Y, and 609Bk, respectively. On the basis of the output signals of the sensor 635, whether any disabled ejection exists for any one of the recording heads 609C, 609M, 609Y, and 609Bk or not, and whether the recording unevenness is more than a given value or not are detected. Then, if necessary, the foregoing ejection recovery process will be executed.

Subsequently, using FIGS. 26 and 27, the description will be made of a usual series of recording sequences. In FIG. 26, when the recording member is fed from the roll 602 or cassette 607, such recording member is detected by a recording member detecting sensor (not shown) positioned immediately before the feeding roller 605. Then, the feeding roller 605 and the sub-scanning roller 606 are driven for a given amount of rotation in the conveying path. These are driven until the leading end of the recording member reaches the sub-scanning roller 606.

Figure 27:
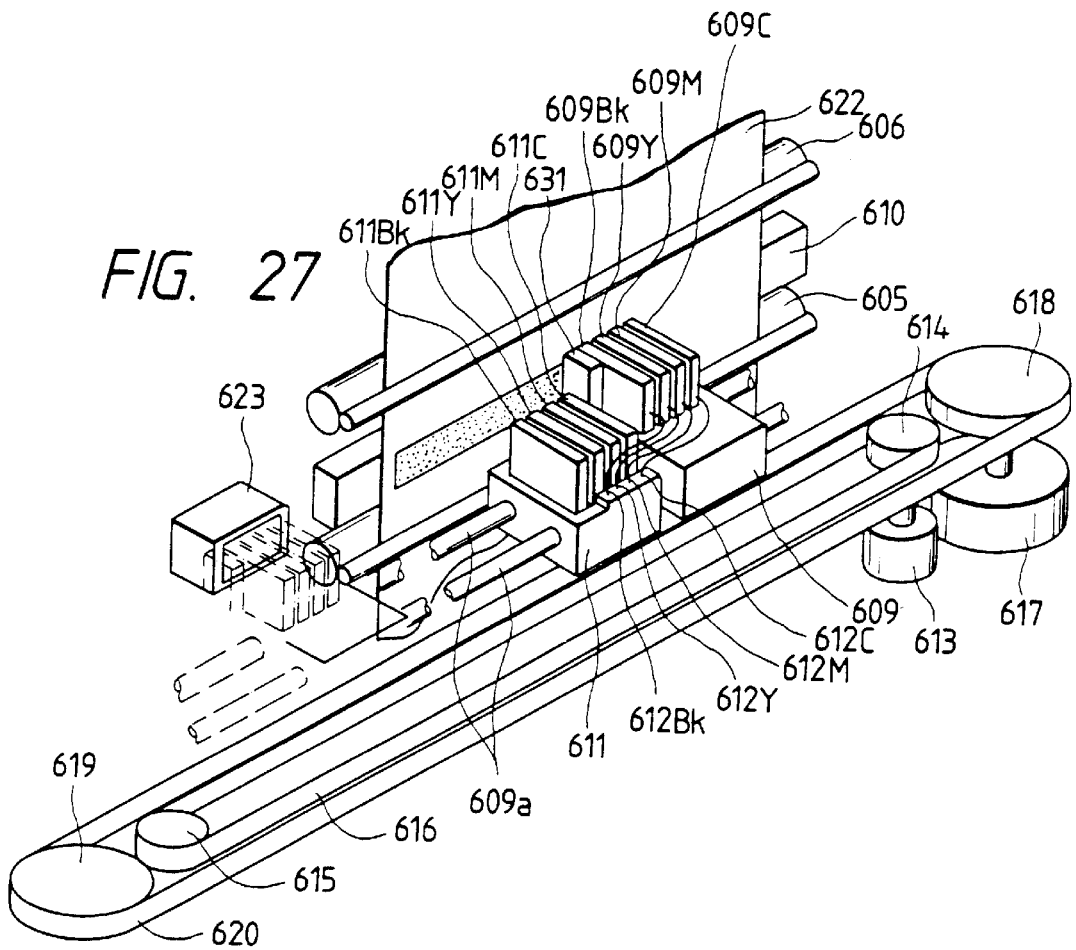
FIG. 27 is a perspective view illustrating the recording unit of a recording apparatus according to the eleventh embodiment.

In FIG. 27, when the recording member 622 is fed until its leading end reaches the sub-scanning roller 606, the carriage 609 and ink supply system 611 are driven by the carriage motor 613 and motor 617 in the main scanning direction (to the right-hand side in FIG. 27), respectively. At the same time, the recording heads 609C, 609M, 609Y, and 609Bk perform recording in the recording width I as shown in FIG. 27 in response to the image signals.

Thus, after the one line recording is terminated, the carriage 609 and ink supply system 611 are driven to return to a given position in the left hand side in FIG. 27, at the same time the recording member 622 is fed by the feeding motor 725 in the sub-scanning direction exactly in accordance with the recording width I.

After the above-mentioned sequences of the recording and feeding of the recording member are executed for a given cycle, the recording member 622 will be discharged outside the apparatus.

Figure 29:
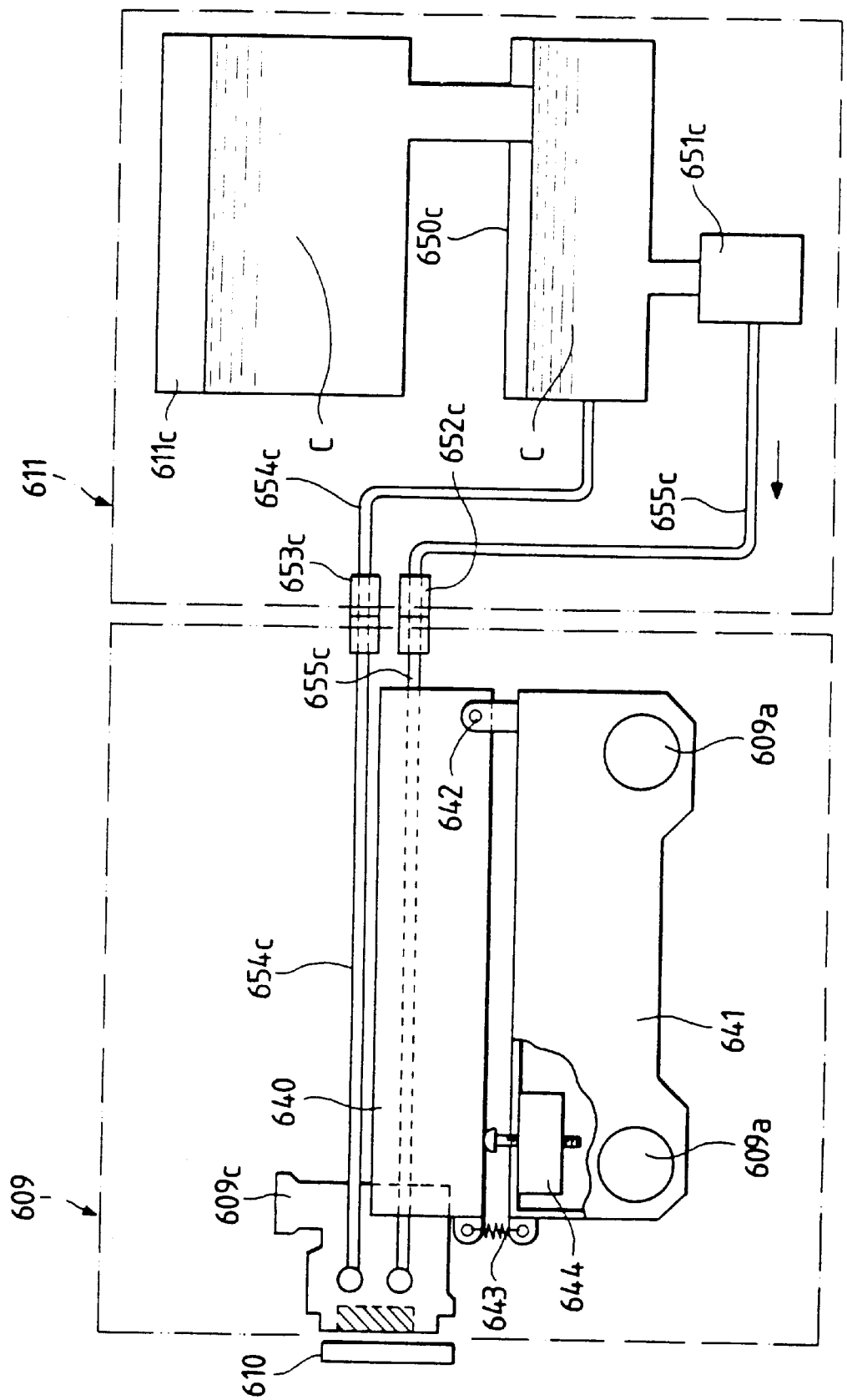
FIG. 29 is a cross sectional view showing the recording head and ink supply system shown in FIG. 27.

Here, the further description of the periphery of the recording heads 609C, 609M, 609Y, and 609Bk will be made with reference to FIG. 29.

The carriage 609 roughly comprises a head holder 640 provided with the recording heads for four color portions 609C, 609M, 609Y, and 609Bk (here only a recording head 609C being shown), and a holder carriage 641 movable on a pair of main scanning rails 609a with the head holder 640 which is mounted on the carriage. This holder carriage 641 has a pin 642 which engages with the head holder 640 in a position (on the right hand side in FIG. 29) opposite to the position where the recording head (609C) is mounted, and supports the head holder 640 rotatively with this pin 642 as its pivot. Also, at the other end of this holder carriage 641, a spring 643 is tensioned between the head holder 640 and the holder carriage 641. By the tension of this spring 643, the head holder 640 is biased toward the holder carriage 641 with the pin 642 as its pivot. Also, the holder carriage 641 is provided with a linear pulse motor 644 in the vicinity of the spring 643, and the terminal 645 of this motor 644 is in contact with the head holder 640. In this way, it is possible to modify the recording position of the recording head (609C) vertically by swinging it with the pin 642 as its pivot against the head holder 640 and the spring 643 by controlling the driving of the motor 644. This linear pulse motor 644 remains in a state at rest when any normal recording is in operation, and is operated when any defects are generated in the recorded image as described later.

Now, with reference to FIG. 29, the process of the ink supply from the ink cartridge 611C to 611Bk will be described. In FIG. 29, a path to supply ink C from the ink cartridge 611C to the tank 650C is shown. At the lower part of the tank 650C, a pump 651C is mounted to perform the ejection recovery process by supplying ink C to the recording head 650C under pressure. The structure of the liquid path of the ink C is such that it extends to the recording head 609C through the supply tube 655C connected to the exhaust outlet of the pump 651C and the supply connector 652C, and then returns again to the tank 650C further through an exhaust connector 653C and an exhaust tube 654C. At the time of recording, the pump 651C is a rest. The ink C which is being consumed for recording is self refilled from the tank 650C by the capillary phenomenon of the recording head 609C through both tubes 655C and 654C. On the other hand, at the time of ejection recovery, the carriage 609 returns to the position for the capping member 623 shown by dashed lines in FIG. 27 and the pump 651C is operated in this state. At this juncture, ink C is circulated between the tank 650C and the recording head 609C through the tubes 655C and 654C, at the same time cleaning off the dust particles, over viscous ink, and others when exhausted also from the ejection surface of the recording head 609C. Thus, the waste ink exhausted from the recording head is collected into a waste ink bottle which is not shown.

According to the above description, the recording head C for cyanogen and its ink supply path are described, but the same structure is also provided for each color of magenta, yellow, and black.

Subsequently, the description will be made of the operation to detect and correct the defective image recording, which is characteristic of this eleventh embodiment.

Figure 30:
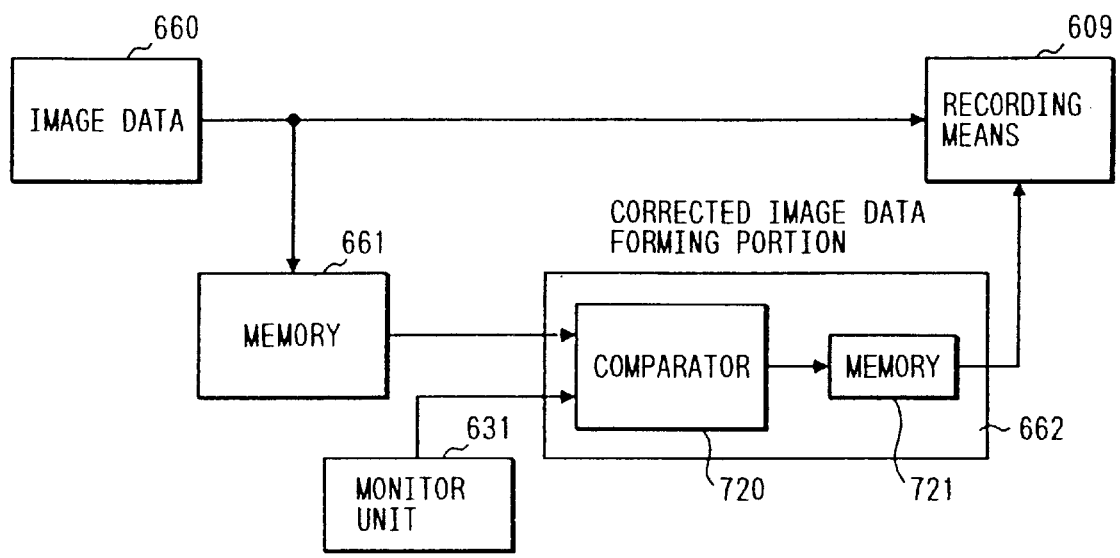
FIG. 30 is a block diagram schematically showing the structure of a recording apparatus according to the eleventh embodiment.

FIG. 30 is a block diagram showing the operation of the image recording apparatus according to the eleventh embodiment. The image data 660 which are transmitted from an image reading apparatus (not shown) such as a scanner or an image input apparatus or other communication means are given to a recording unit (recording head) to form the recorded image on a recording sheet in accordance with the image data 660. Also, the image data 660 are tentatively stored in a memory 661 simultaneously. On the other hand, a monitor unit 631 reads the recorded image by the recording head to form the monitoring image data and transmits them to a corrected image data forming portion 662. In the corrected image data forming portion 662, the image data 660 stored in the memory 661 and the monitoring data read by the monitor unit 631 are compared by a comparator 720. If the data are the same, it is determined that a desired recording has been obtained. Also, if the recorded image and the image data stored in the memory 661 are different, it is assumed that image defects (disabled ejection) have taken place, and the image data for this portion are stored in a memory 721. Then, when one-line recording is terminated and the carriage 609 is on its way to its home position, the aforesaid linear pulse motor 644 is driven to modify the vertical position of the recording head thereby to perform a correction recording from the different discharging ports of the recording head to complement such missing portion in accordance with the corrected image data.

Figure 31:
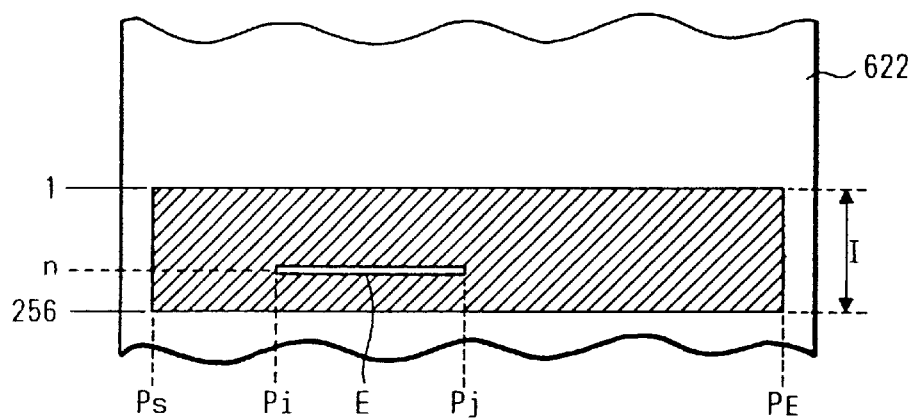
FIG. 31 is a view showing an example of the image defect due to the defective ejection of a nozzle.

If a recording is performed with a defective ejection portion E as shown in FIG. 31, for example, it is determined by the CCD sensor 635 of the monitor unit 631 that the defective ejection is generated by the nth ejection outlet of the discharging ports (nozzles of the recording head) numbered one to 256. Also, referring to the driving pulses of the carriage motor 613 which controls the reciprocation of the carriage 609, the pulse numbers are measured where the pulse number at the time of starting the recording is $P_S$, and the pulse number at the time of terminating the recording is $P_E$. Thus, for example, with the recognition that the defective ejection takes place between $P_i$ to $P_j$ among the measured pulse numbers, the position of such a defective ejection can be specified. In this way, when the carriage 609 is in its returning motion, the linear pulse motor 644 is driven to modify the recording position of the recording head in order to execute the intended correction recording for this defective ejection portion E by enabling the discharging port (nozzle) numbered (n+k) to face such portion in place of the nth nozzle, for example.

Figure 32:
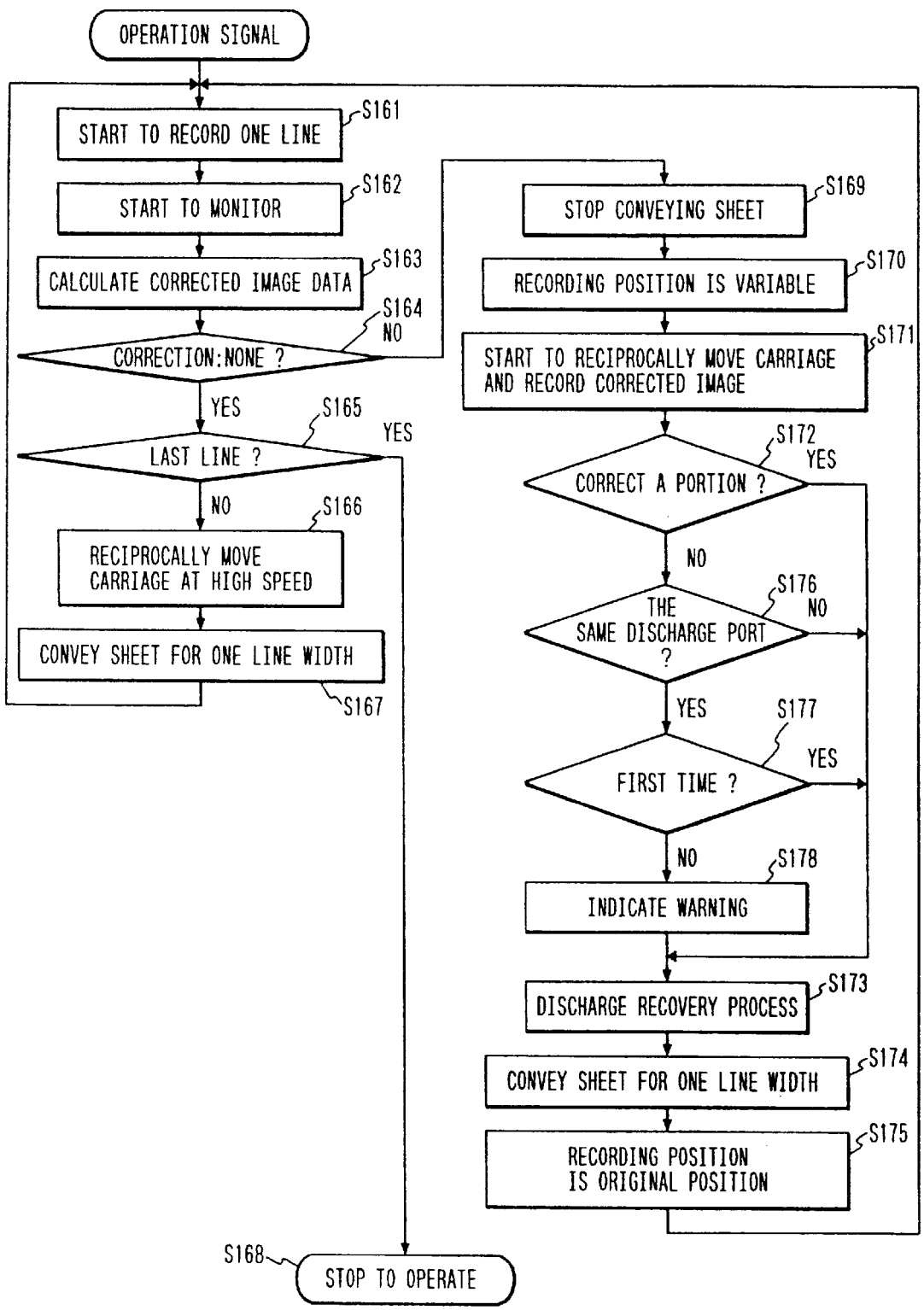
FIG. 32 is a flowchart showing the recording process in a printing apparatus according to the eleventh embodiment.

Now, with reference to a flowchart shown in FIG. 32, the operation of the eleventh embodiment will be described.

At first, in step S161, when one line recording is terminated after the recording heads 609C, 609M, 609Y, and 609Bk have scanned one scanning portion, the recorded image is read by the monitor unit 631 in step S162 at the same time. Thus, as described earlier, the corrected image data are calculated (step S163). Here, if no correction is required (step S164), the carriage 609 is returned at a high speed (step S166). During this period, the recording sheet 622 is fed by a width corresponding to the one line thus recorded (step S167). These operations will be repeated until the last line is recorded.

On the other hand, in step S164, if it is determined that a portion to be corrected (defective ejection) exists, the sequence will proceed to step S169 where the linear pulse motor 644 is driven to be rotated to modify the recording position of the recording head without feeding the recording sheet 622; hence enabling a discharging port ((n+K)th nozzle) other than the discharging port which has generated the defective ejection (nth nozzle) to face the position on the recording sheet where such defective recording has occurred (step S170) as described earlier with reference to FIG. 31. Then, while the recording head is being returned at the same speed as at the time of usual recording, the correction recording will be performed (step S171) by causing the (n+k)th nozzle to eject ink on the basis of the corrected image data when the recording head reaches such a position where the correction is required.

Then, proceeding to step S172, whether such defective ejection is only a local one (self recovery) or not is determined. If it is found to be a local one, the sequence will proceed to step S173 where the carried 609 is returned to the position opposite to the capping member 623 for the execution of the ejection recovery process. Thus, in step S174, the recording sheet 622 is fed during this period by one line width in the sub-scanning direction (step S174). Also, the linear pulse motor 644 is driven to be rotated to cause the recording head to return to the normal position (step S175) and then, the recording operation for the next line will be executed.

On the other hand, in the step S172, if it is determined that the defective ejection is not local one but the discharging port (nozzle) is completely clogged, the sequence will proceed to step S176 to determine whether such defective recording has been caused by the same nozzle or not and further in step S177 to determine whether it is for the first time or not. If it is determined that such is not by the same discharging port or such is by the same discharging port but for the first time, the sequence will proceed to step S173 to execute the operations to follow thereafter. Otherwise, the sequence will proceed to step S178 and display a warning to prompt the replacement of recording heads with the determination that the discharging port is completely clogged and no recovery is possible even after the recovery process is executed once. Then, the sequence will proceed to step S173 to execute the operations to follow without suspending the recording operation.

Therefore, even when a certain discharging port (nozzle) of the recording head is completely clogged, it is possible to perform a correction recording using some other nozzle without replacing the recording head. As a result, it is possible to conduct an unmanned operation for a long period of time because it is unnecessary for an operator to watch the recording condition at all times even in a recording mode where an elongated recording material such as a cloth is used for a long-time recording, for example.

In this respect, according to the eleventh embodiment set forth above, the recording position of a recording head is made variable with respect to a recording sheet by means to vary the recording position by the recording head, but the present invention is not confined thereto. It will suffice if only the positions of the recording sheet and recording head can be varied interrelatedly. For example, therefore, it may be possible to make the position of the recording sheet 622 variable with respect to the recording head by arranging the pair of the feeding rollers 605 and 606 shown in FIG. 27 to be normally and reversely rotatable.

The present invention produces an excellent effect on an ink jet recording head and recording apparatus, particularly on those employing a method for utilizing thermal energy to form flying ink droplets for the recording performance.

Regarding the typical structure and operational principle of such a method, it is preferable to adopt those which can be implemented using the fundamental principle disclosed in the specifications of U.S. Pat. Nos. 4,723,129 and 4,740,796. This method is applicable to the so-called on-demand type recording system and a continuous type recording system. Particularly, however, it is suitable for the on-demand type because the principle is such that at least one driving signal, which provides a rapid temperature rise beyond a departure from nucleation boiling point in response to recording information, is applied to an electrothermal transducer disposed on a liquid (ink) retaining sheet or liquid passage whereby to cause the electrothermal transducer to generate thermal energy to produce film boiling on the thermoactive portion of the recording head; thus effectively leading to the resultant formation of a bubble in the recording liquid (ink) one to one for each of the driving signals. By the development and contraction of the bubble, the liquid (ink) is ejected through a discharging port to produce at least one droplet. The driving signal is preferably in the form of pulses because the development and contraction of the bubble can be effectuated instantaneously, and, therefore, the liquid (ink) is ejected with quick response.

The driving signal in the form of pulses is preferably such as disclosed in the specifications of U.S. Pat. Nos. 4,463,359 and 4,345,262. In this respect, if the conditions disclosed in the specification of U.S. Pat. No. 4,313,124 regarding the rate of temperature increase of the heating surface preferably are adopted, it is possible to perform an excellent recording.

The structure of the recording head may be as shown in each of the above-mentioned specifications wherein the structure is arranged to combine the discharging ports, liquid passages, and electrothermal transducers as disclosed in the above-mentioned patents (linear type liquid passage or right angle liquid passage). Besides, it may be possible to form a structure such as disclosed in the specifications of U.S. Pat. Nos. 4,558,333 and 4,459,600 wherein the thermally activated portions are arranged in a curved area.

In addition, it is possible for the present invention to adopt a structure such as disclosed in Japanese Laid-Open Application No. 59-123670 wherein a common slit is used as the discharging ports for plural electrothermal transducers, and also a structure such as disclosed in Japanese Patent Laid-Open Application No. 59-138461 wherein an opening for absorbing pressure waves of the thermal energy is formed corresponding to the discharging ports.

Furthermore, as a full line type recording head having a length corresponding to the maximum recording width, it may be possible to arrange a structure either by combining plural recording heads disclosed in the above-mentioned specifications or by a single recording head integrally constructed to cover such a length.

In addition, the present invention is applicable to a replaceable chip type recording head which is connected electrically with the main apparatus and can be supplied with ink when it is mounted in the main assembly, or to a cartridge type recording head having an integral ink container.

Also, it is preferable to additionally provide recording head recovery means and preliminarily auxiliary means which are arranged as constituents of a recording apparatus according to the present invention. These elements will contribute to making the effectiveness of the present invention more stabilized. To name them specifically, such elements are capping means for the recording head, cleaning means, compression or suction means, preliminary heating means such as electrothermal transducers or heating elements other than such transducing type or the combination of those types of elements, and means for effecting a preliminary ejection mode besides the regular ejection for recording.

Furthermore, as a recording mode for the recording apparatus, it is not only possible to arrange a monochromatic mode mainly with black, but also it may be possible to arrange an apparatus having at least one of multi-color mode with different color ink materials and/or a full-color mode using the mixture of the colors irrespective of the recording heads which are integrally formed as one unit or as a combination of plural recording heads.

Now, in the embodiments according to the present invention set forth above, while the ink has been described as liquid, it may be an ink material which is solidified below the room temperature but liquefied at the room temperature. Since the ink is controlled within the temperature not lower than 30° C. and not higher than 70° C. to stabilize its viscosity for the provision of the stable ejection in general, the ink may be such that it can be liquefied when the applicable recording signals are given.

In addition, while preventing the temperature rise due to the thermal energy by the positive use of such energy as an energy consumed for changing states of the ink from solid to liquid, or using the ink which will be solidified when left intact for the purpose of preventing ink evaporation, it may be possible to apply to the present invention the use of an ink having a nature of being liquefied only by the application of thermal energy such as an ink capable of being ejected as ink liquid by enabling itself to be liquefied anyway when the thermal energy is given in accordance with recording signals, an ink which will have already begun solidifying itself by the time it reaches a recording medium. For an ink such as this, it may be possible to retain the ink as a liquid or solid material in through holes or recesses formed in a porous sheet as disclosed in Japanese Patent Laid-Open Application No. 54-56847 or Japanese Patent Laid-Open Application No. 60-71260 in order to execute a mode whereby to enable the ink to face the electrothermal transducers in such a state. For the present invention, the most effective method for each of the above-mentioned ink materials is the one which can implement the film boiling method described above.

In addition, as modes of a recording apparatus according to the present invention, there are a copying apparatus combined with reader and the like or those used as an image output terminal integrally or separately structured for an information processing apparatus such as a word processor and a computer, and further, those adopting a mode as a facsimile apparatus having transmission and reception functions.

In this respect, the description has been made of a case where one dot constitutes one pixel in the above-mentioned embodiments, but the present invention is not confined thereto. The present invention is of course applicable to multi-valued recording wherein a plurality of dots constitute one pixel.

Also, in the above-mentioned embodiments, the nozzles of a recording head are all installed integrally therewith, and the description has been made of a case where the recording is performed by driving different nozzles in accordance with each scanning, but the present invention is not confined thereto. It may be possible to perform recording by multi-scanning using the separate recording heads accordingly. Also, when such separate heads are used, it may be possible to arrange them in the sub-scanning direction at intervals of a space integer times the width of the sub-scan feeding.

Also, in a case of color image recording, the above-mentioned embodiments should only be implemented for each color.

In this respect, the present invention may be applicable to a system consisting of a plurality of pieces of equipment or to a system formed by a single piece of equipment. Also, the present invention is applicable of course to a case where the operations are executed by providing a system or an apparatus with a program which enables the present Invention to be implemented.

As described above, according to these embodiments, even if a disabled ejection occurs in one scanning at the time of recording by a multi-scanning, the missing dot is complemented by the following scan; hence making it possible to obtain an image having no image defects at all times.

As set forth above, according to the present invention, there is an effect that in a recorded image, the defects are significantly reduced.

Also, even if any defects are generated in a recorded image, these are effectively detected automatically. Also, according to the present invention, it is possible to obtain an even image with a small fluctuation of the density.

The recorded matter applied with additional treatments as mentioned above is then divided into pieces each having a desired size. The divided pieces are treated with a final process, such as sewing, adhesion and solvent welding to obtain final products, for example clothes such as one-piece or two piece dresses, ties, swimming suits or pants, bedspreads, covers for sofas, handkerchiefs and curtains. Cloths made of materials such as cotton or silk and others is treated by, for example sewing and made into clothes and other commodities as disclosed in MODERN KNITTING AND SEWING MANUAL published by Seni Journal (Fiber Journal), SOEN by Bunka Shuppan and many others.

What is claimed is:

1. An image recording apparatus for recording an image on a recording medium by causing a recording head having an arrangement of a plurality of recording elements to scan the recording medium, said apparatus comprising:

recording means for causing the recording head to scan the recording area of the recording medium plural times for recording, wherein, during scans by said recording means, the recording head partially overlaps the area previously scanned by the recording head, and the recording area scanned by said recording means is recorded by a plurality of different recording elements;

reading means for reading a recorded image recorded on the recording medium by scanning the recording area of the recording medium together with the recording head when the recording is executed by said recording means;

determining means for discriminating a defectively recorded area by comparing the recorded image read by said reading means and the image information to be recorded;

complementary recording means for causing complementary recording of the defectively recorded area discriminated by said determining means at the time of a subsequent scanning by the recording head; and a complementary head for recording complementarily the defectively recorded area discriminated by said determining means subsequent to the recording by said recording means by scanning the recording area of said recording medium following said reading means.

2. An image recording apparatus for recording an image on a recording medium by causing a recording head having an arrangement of a plurality of recording elements to scan the recording medium, said apparatus comprising:

recording means for causing the recording head to scan the recording area of the recording medium plural times for recording reading means for reading a recorded image recorded on the recording medium by scanning the recording area of the recording medium together with the recording head when the recording is executed by said recording means;

determining means for discriminating a defectively recorded area by comparing the recorded image read by said reading means and the image information to be recorded; and complementary recording means for causing complementary recording of the defectively recorded area discriminated by said determining means at the time of a subsequent scanning by the recording head, wherein said complementary recording means performs its complementary recording by lowering the driving frequency of the recording head.

* * * * *

UNITED STATES PATENT AND TRADEMARK OFFICE
CERTIFICATE OF CORRECTION

PATENT NO. : 6,547,361 B1
DATED : April 15, 2003
INVENTOR(S) : Akio Suzuki et al.

It is certified that error appears in the above-identified patent and that said Letters Patent is hereby corrected as shown below:

Column 1,
Line 18, "well known an" should read -- a well-known --.

Column 2,
Line 63, "recovered" should read -- recovered by --.

Column 3,
Line 5, "a" (second occurrence) should be deleted.

Column 4,
Line 23, "language" should read -- term --.

Column 5,
Line 30, "an" should read -- a --.

Column 9,
Line 21, "clothes," should read -- cloths, --.

Column 14,
Line 6, "in" should read -- ink --; and
Line 16, "The" should read -- the --.

Column 16,
Line 2, "such" should read -- such a --.

Column 17,
Line 24, close up right margin; and
Line 25, close up left margin.

Column 20,
Line 16, "a" should read -- an --; and
Line 27, "head" (second occurrence) should be deleted.

UNITED STATES PATENT AND TRADEMARK OFFICE
CERTIFICATE OF CORRECTION

PATENT NO. : 6,547,361 B1
DATED : April 15, 2003
INVENTOR(S) : Akio Suzuki et al.

It is certified that error appears in the above-identified patent and that said Letters Patent is hereby corrected as shown below:

Column 23,
Line 4, "cartridge" should read -- cartridges --; and
Line 15, "a" should read -- at --.

Column 24,
Line 46, "(self recovery)" should read -- (self-recovery) --; and
Line 48, "carried" should read -- carriage --.

Column 27,
Line 38, "Invention" should read -- invention --; and
Line 49, "these" should read -- they --.

Column 28,
Line 42, "recording" should read -- recording; --.

Signed and Sealed this

Twenty-third Day of December, 2003

JAMES E. ROGAN
*Director of the United States Patent and Trademark Office*